(12) United States Patent
Bitar et al.

(10) Patent No.: US 9,749,851 B2
(45) Date of Patent: Aug. 29, 2017

(54) IP AGGREGATION FOR LTE-BASED MOBILE NETWORKS

(71) Applicants: Verizon Patent and Licensing Inc., Basking Ridge, NJ (US); Cellco Partnership, Basking Ridge, NJ (US)

(72) Inventors: Nabil N. Bitar, Acton, MA (US); Samir Ait-Ameur, Fremont, CA (US); Kalyani Bogineni, Hillsborough, NJ (US); Praveen Atreya, Jersey City, NJ (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 842 days.

(21) Appl. No.: 13/630,853

(22) Filed: Sep. 28, 2012

(65) Prior Publication Data

US 2014/0092772 A1   Apr. 3, 2014

(51) Int. Cl.
*H04L 12/28* (2006.01)
*H04W 8/26* (2009.01)
(Continued)

(52) U.S. Cl.
CPC ........... *H04W 8/26* (2013.01); *H04L 61/2015* (2013.01); *H04L 61/2061* (2013.01); *H04L 61/2076* (2013.01); *H04W 40/02* (2013.01)

(58) Field of Classification Search
CPC ....... H04W 88/16; H04W 8/26; H04W 12/06; H04W 40/00; H04W 88/08; H04W 36/0011; H04W 16/18; H04W 28/0226; H04W 40/20; H04W 76/02; H04W 8/02; H04L 45/50; H04L 63/0869; H04L 12/66; H04L 12/462; H04L 61/2015; H04L 63/08; H04L 69/16; H04L 47/14; H04L 41/12; H04L 45/02; H04L 12/5692; H04L 29/12216; H04L 29/12283; H04L 29/12301

(Continued)

(56) References Cited

U.S. PATENT DOCUMENTS 7,184,418 B1 * 2/2007 Baba et al. .................... 370/331
2008/0008179 A1 * 1/2008 Chen et al. .................... 370/392
(Continued)

*Primary Examiner* — Yemane Mesfin
*Assistant Examiner* — Mon Cheri Davenport

(57) ABSTRACT

A mobile architecture system includes a plurality of connection nodes each comprising an access interface and at least one network interface. A plurality of aggregation layer devices are each coupled to respective sets of connection nodes to form aggregation regions. A backhaul network is coupled to each of the aggregation layer devices, and a mobility entity is coupled to the backhaul network, wherein each of the connection nodes is configured to receive attachment requests from at least one user device. The aggregation layer devices are configured to assign IP addresses to user devices connected to connection nodes coupled to the respective aggregation layer devices. The aggregation layer devices are configured to determine IP routes from the backhaul network to the connection nodes based on the assigned IP addresses. The aggregation layer devices are further configured to notify respective connection nodes regarding the IP addresses assigned to connected user devices.

24 Claims, 12 Drawing Sheets

(51) Int. Cl.
*H04L 29/12* (2006.01)
*H04W 40/02* (2009.01)

(58) Field of Classification Search
USPC ....... 370/216, 252, 254, 328–331, 389, 392, 370/400–401
See application file for complete search history.

(56) References Cited

U.S. PATENT DOCUMENTS

2009/0106213 A1* 4/2009 Danforth ........... H04L 29/12028
2009/0233609 A1* 9/2009 Iun et al. ...................... 455/445
2013/0089037 A1* 4/2013 Negus .................. H04B 7/0691
370/329

\* cited by examiner

IP AGGREGATION FOR LTE-BASED MOBILE NETWORKS

BACKGROUND

Current Long Term Evolution (LTE)-based networks include a variety of devices, such as enhanced Node Bs (eNBs), mobility management entities (MMEs), packet gateways (PGWs), and serving gateways (SGWs). Current Third Generation Partnership Project (3GPP) and LTE standards require the PGW to function or serve as an anchoring point for any user equipment (UE). That is, all traffic between the UEs and the Internet necessarily travels through the anchor PGW. However, the anchoring function of the PGW is static and cannot be combined with the functionality of the SGWs, the MMEs, and/or the eNBs. Furthermore, anchoring UEs (e.g., anchoring bearer paths associated with UEs) at a particular PGW could increase transport cost and resource utilization at the particular PGW, depending on the relative location of the UE to the PGW and the far endpoint. This causes network transport and PGW resources to be inefficient at handling large traffic loads when the network grows to include a large number of eNBs or larger bandwidth per user.

DETAILED DESCRIPTION OF PREFERRED EMBODIMENTS

Figure 1:
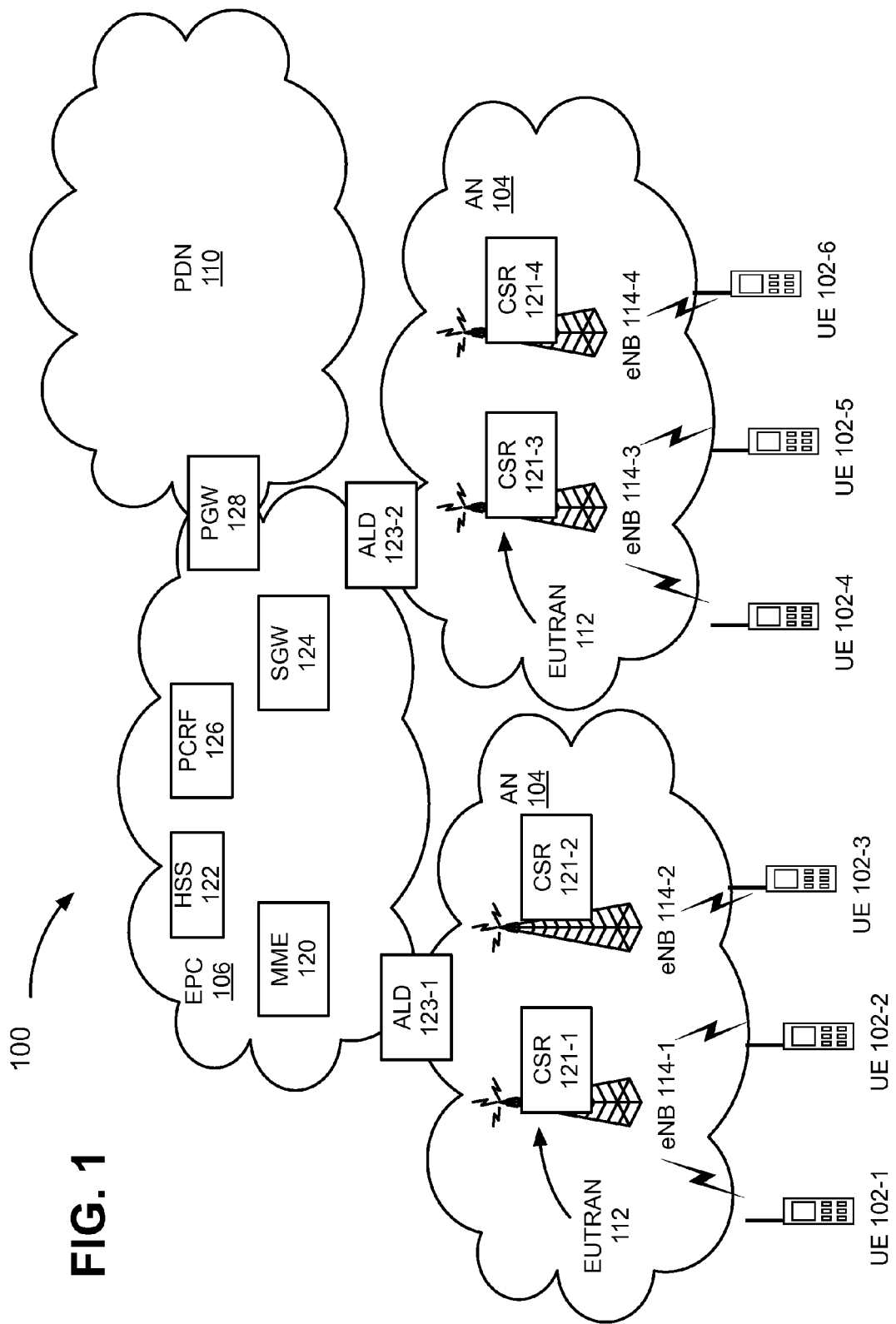
FIG. 1 is a diagram of an exemplary long term evolution (LTE) network.

The following detailed description refers to the accompanying drawings. The same reference numbers in different drawings may identify the same or similar elements. Also, the following detailed description does not limit the invention.

According to embodiments described herein, a high speed mobile network, such as a Long Term Evolution (LTE) network, may include an aggregation layer for handling Internet Protocol (IP) mobility across regions and sub-regions in the network. For example, an aggregation layer network device, such as an aggregation layer router, supports region-level IP routing for subscriber devices (referred to herein as user equipment (UE)) connected to the aggregation layer device often through other devices, and may support regionalized IP address allocation. IP address allocation to UEs may also be supported via another network element that allocates IP addressing based on the region in which the UE is located. In addition, IP routing at the micro-region level may be supported by a number of micro-region routing devices, such as cell site routing devices (also referred to as connection nodes) associated or integrated with wireless base stations. Supporting both regional and micro-regional routing and policy enforcement allows for significant reductions in backhaul network bandwidth utilization.

In one implementation, the aggregation layer network device (referred to herein as an aggregation layer device or ALD) may include a dynamic host control protocol (DHCP) server that is assigned a pool of available IP addresses associated with its serving region. The serving region for each ALD may be a sub-region for an overarching region associated with a particular network, such as a geographic region associated with a particular packet data network gateway (PGW). A subscriber device connecting to a base station (and corresponding connection node or cell site routing device) within an ALD region initially acquires an IP address from the respective ALD serving the region that includes the base station. In addition, routing policies relating to the subscriber may be acquired by the ALD and may be forwarded (in whole or in part) to the micro-region routing device to assist in efficient routing of data and reduction in backhaul utilization.

When a subscriber device transitions from one base station (micro-region device) to another micro-region device within a particular region (e.g., both served by a single ALD), a context associated with the initial connection (e.g., the assigned IP address and any policies provided on the sub-region device) may be transferred between the micro-region devices. This context may inform the new micro-region device of the IP address assigned to the subscriber device (by the ALD) as well as any policies necessary to enable the micro-region device to route downstream and upstream traffic to and from the subscriber device and to exercise local policies on that traffic. Application of policies can be split between the ALD and the CSR or CN. In addition, during such a transition, the ALD associated with both the first micro-region device and the new micro-region device may be configured to forward traffic to the new micro-region device via a tunnel established between the first micro-region device and the new micro-region device. This allows, thereby allowing seamless transition of data to the subscriber device, irrespective of the particular micro-region device to which it is connected.

Such policies may be enforced to determine whether the particular subscriber should be anchored to the previous sub-region. That is, policies may determine whether the IP address previously associated with the particular subscriber device should be maintained in the prior sub-region along with forwarding or routing information designating the new region (e.g., the new aggregation layer network device). IP traffic to or from the subscriber device is then routed via the prior region's aggregation layer network device, to ensure that loss of IP connectivity or IP session interruption does not occur. In some embodiments, application of such policies may be application-specific, such as when a session includes real-time related data, such as video calls, streaming media, or voice calls.

In an alternative simplified architecture, the above-described aggregation region and micro-region handling may be implemented in collapsed manner. For example, the network may include a plurality of distributed and interconnected connection nodes (CNs) operatively coupled to a number of distributed ALDs that, in turn, are coupled to a mobility control unit (MCU) and a packet data network (PDN) (e.g., the Internet) via an IP backhaul network. Such an implementation avoids the requirement for utilizing discrete PGW and serving gateway (SGW) devices to connect to the PDN. In this embodiment, subscriber devices may connect or attach to the CNs via any of a number of suitable access technologies. Once attached, the UEs may each communicate, directly or indirectly, with the MCU via one of the CNs and a corresponding ALD to authenticate with the network.

FIG. 1 is a diagram of an exemplary LTE network 100 consistent with implementations described herein. As illustrated, LTE network 100 includes a number of user equipment (UE) devices 102-1, 102-2 and 102-x (collectively referred to as UEs 102 or individually as UE 102), an access network 104, an evolved packet core (EPC) 106, and a packet data network (PDN) 110, such as the Internet or a proprietary packet data network. Access network (AN) 104 may include an evolved universal terrestrial radio access network (E-UTRAN) 112, a number of eNodeBs (eNBs) 114-1 to 114-4 (collectively referred to as eNBs 114 or individually as eNB 114), a number of micro-region routing devices 121-1 to 121-4 (referred to herein as cell site routing devices (CSRs) 121 or individually as CSR 121). EPC 106 may include a mobility management entity (MME) 120, a number of aggregation layer network devices (ALDs) 123-1 and 123-2 (collectively referred to as ALDs 123 or individually as ALD 123), a home subscriber server (HSS)/ authentication, authorization, and accounting (AAA) server 122, a serving gateway (SGW) 124, policy and charging rules function (PCRF) device 126, and a PDN gateway (PGW) 128. Devices/networks of network 100 may interconnect via wired and/or wireless connections.

Six UEs 102, access network 104, EPC 106, PDN 110, E-UTRAN 112, four eNBs 114, four CSRs 121, two ALDs 123, MME 120, HSS 122, SGW 124, PCRF 126, PGW 128 have been illustrated in FIG. 1 for simplicity. In practice, there may be more or fewer devices or components. For example, a typical network 100 includes millions of subscriber UEs 102, thousands of eNBs 114 and CSRs 121, thousands or hundreds of ALDs 123, hundreds of SGWs 124 and several PGWs 128 effectively forming a hierarchical access network in which traffic passes from PDN 110 to UE 102 via a particular PGW 128, SGW 124, ALD 123, and eNB 114/CSR 121.

UE 102 may include any communication device configured to communicate via one or more wireless radio signals. For example, UE 102 may include radiotelephone (commonly referred to as a cellular telephone), a wireless telephone, a smart phone, a personal digital assistant (PDA) (e.g., that can include a radiotelephone, Internet/intranet access, etc.), a tablet computer, a laptop computer, a personal computer, a gaming device, an entertainment device (e.g., Blu-ray device, smart television, etc.), or other types of computation or communication devices. In an exemplary implementation, UE 102 may include any device that is capable of communicating over access network 104, EPC network 106, and/or PDN 110. UE 102 operates according to one or more versions of the LTE communication standard.

Access network 104 includes a communications network that connects subscribers (e.g., UE 102) to a service provider. In one example, access network 104 may include a WiFi network or other access networks (e.g., in addition to E-UTRAN 112). EPC 106 includes a core network architecture of the 3GPP LTE wireless communication standard. PDN 110 includes a network that provides data services (e.g., via packets or any other IP datagrams). For example, PDN 110 may include the Internet, an intranet, etc.

E-UTRAN 112 includes a radio access network capable of supporting high data rates, packet optimization, large capacity and coverage, etc. eNBs 114 includes network devices that operate according to one or more versions of the LTE communication standard. For example, eNBs 114 may be configured to respond to UE requests, forward information regarding UEs 102 to MME 120 and/or SGW 124, set up tunneling sessions with other devices (e.g., SGW 124), etc. As described generally above, CSRs 121 may be associated with eNBs 114 and may perform routing functions relating to a particular micro-region, e.g., geographically associated with a respective eNBs 114. In some embodiments, CSRs 121 may aggregate the routing of tunnel traffic between devices.

ALDs 123 may be coupled to a number of CSRs 121/ eNBs 114 and to EPC 206 and are configured to perform mobility management functions on a regional level, relative to EPC 106. For example, ALDs 123 may each include a DHCP server and an assigned pool of IP addresses for allocating to connected UEs 102. This is in contrast to conventional LTE in which IP address allocation is performed by the PGW.

ALDs 123 may acquire routing policies relating to the subscriber, e.g., from PCRF 126 described below and may forward (in whole or in part) these policies to CSRs 121 to assist in efficient routing of data and reduction in backhaul utilization.

Consistent with implementations described herein, ALDs 123 may support mobility handoff both at the micro-region level (e.g., between CSRs 121/eNBs 114 in a particular region) and between different ALDs 123. As described in detail below, ALDs 123 may effect a transfer of context between CSRs 121 and may dynamically configure aggregation layer routing information to effect such a handoff. In addition, ALDs 123 may support temporary CSR anchoring and tunneling during handoff to minimize the possibility of data loss. In addition, ALDs 123 manage and store contexts associated with UEs 102 (e.g., parameters of an IP bearer service, network internal routing information, etc.).

MME 120 is responsible for idle mode tracking and paging procedures (e.g., including retransmissions) for UE 102. For example, MME 120 maintains information regarding a current state (e.g., powered on, location, etc.) of UE 102. MME 120 is also involved in the bearer activation/ deactivation process (e.g., for UE 102) and operates to choose a particular SGW 124 for UE 102 at an initial attach and at a time of intra-LTE handover. In addition, MME 120 authenticates UE 102 (e.g., via interaction with HSS 122). Non-access stratum (NAS) signaling terminates at MME 120 and MME 120 generates and allocates temporary identities to UEs (e.g., UE 102).

Furthermore, MME 120 may check authorization of UE 102 to connect to a service provider's Public Land Mobile Network (PLMN) and may enforce roaming restrictions for UE 102. MME 120 may be a termination point in EPC network 106 for ciphering/integrity protection for NAS signaling and may handle security key management. MME 120 may provide a control plane function for mobility between LTE and 2G/3G 3GPP access networks with an S3 interface terminating at MME 120. MME 120 may also terminate an S6a interface towards HSS 122 for roaming UEs.

HSS/AAA 122 is configured to include a master user database that supports devices on PDN 110 that handle calls, such as proxy devices, session border controllers, etc. HSS/AAA 122 may contain subscription-related information (e.g., subscriber profiles), may perform authentication and authorization of a user based on requests received from MME 120, and may provide information about a subscriber's location and IP information.

SGW 124 routes and forwards user data packets, acts as a radio mobility anchor for a user plane during inter-eNB/CSR handovers, and also acts as a radio anchor for mobility between LTE and other 3GPP technologies (referred to as "inter-3GPP mobility"). As shown, SGW 124 is connected to eNBs 114 to provide a radio layer mobility control plane.

PCRF 126 provides policy control decision and flow based charging control functionalities. PCRF 126 may provide network control regarding service data flow detection, gating, quality of service (QoS) and flow based charging, etc. PCRF 126 may determine how a certain service data flow shall be treated, and may ensure that user plane traffic mapping and treatment is in accordance with a user's subscription profile.

During initial subscriber connection a respective ALD 123 may obtain policy and subscriber data from HSS/AAA 122 and PCRF 126. During handoff between ALDs 123, this information may be exchanged with a new ALD to ensure continuity of service as the subscriber moves about network 100.

PGW 128 includes one or more data transfer devices (or network devices), such as a gateway, a router, a switch, a firewall, a network interface controller (NIC), a hub, a bridge, a proxy server, or some other type of device that processes and/or transfers data. PGW 128 provides connectivity of UE 102 to external packet data networks (e.g., to PDN 110) by being a traffic exit/entry point for UE 102. In some implementations, UEs 102 may simultaneously connect to more than one PGW for accessing multiple PDNs. PGW 128 may perform policy enforcement, packet filtering for each user, charging support, lawful intercept, and packet screening. PGW 128 may also act as an anchor for mobility between 3GPP and non-3GPP technologies.

Figure 2:
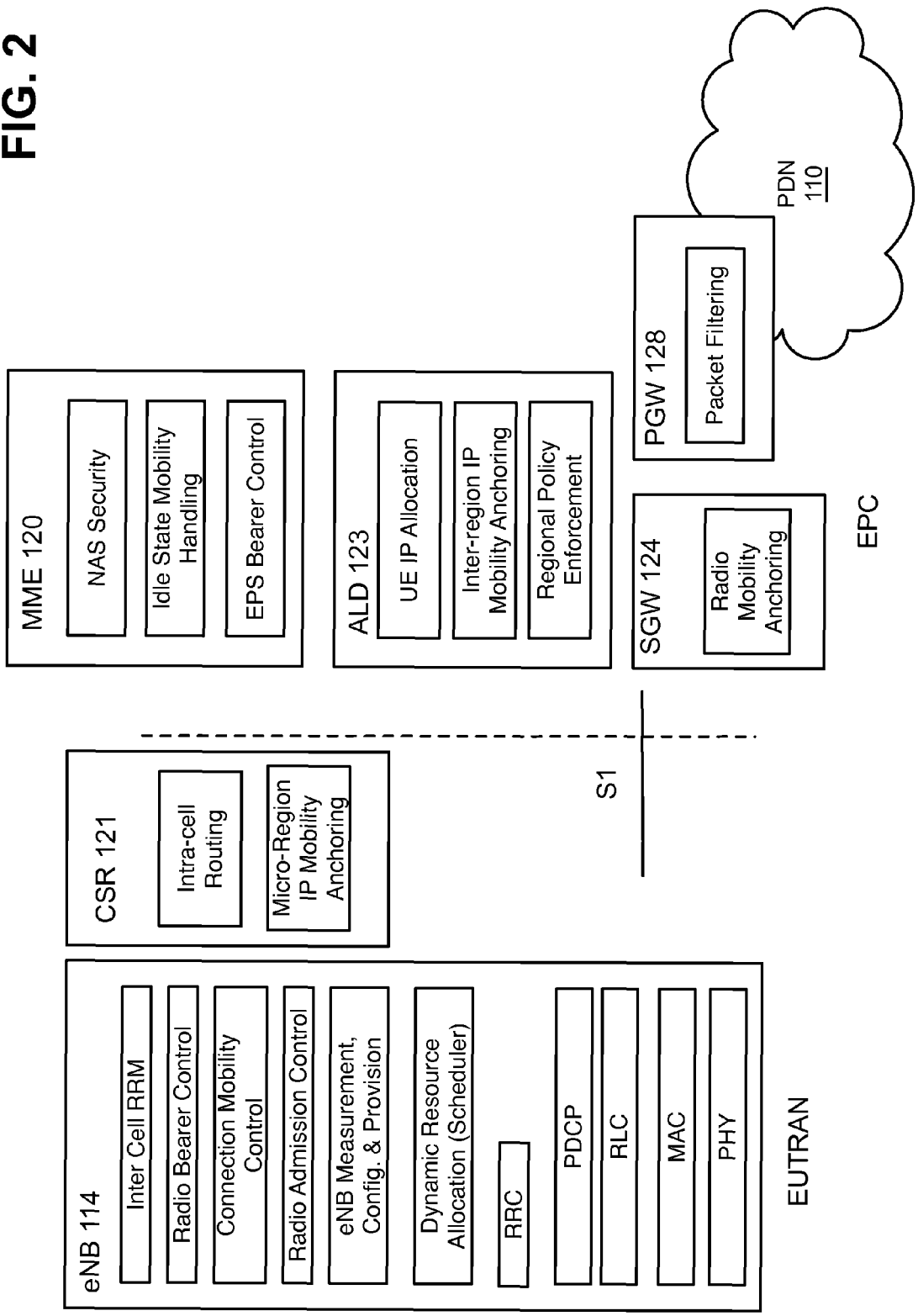
FIG. 2 is a block diagram showing the functional split between the eNB and the Evolved Packet Core (EPC) in FIG. 1.

FIG. 2 is a block diagram showing the functional split between the components of EUTRAN 112 and EPC 106. As described above, EUTRAN 112 includes eNBs 114 and CSRs 121. Each eNB 114 hosts functions for Radio Resource Management (RRM) such as Radio Bearer (RB) Control, Radio Admission Control, Connection Mobility Control, Dynamic allocation of resources to UEs in both uplink and downlink (scheduling), and eNB measurement, configuration, and provisioning. Each eNB 114 also hosts functions for IP (Internet Protocol) header compression and encryption of user data stream, routing of user plane information data towards SGW 124, the scheduling and transmission of paging messages to MME 120, the scheduling and transmission of broadcast information, and the measurement and measurement reporting configuration for mobility and scheduling.

CSRs 121 host functions for intra-cell routing and micro-region IP mobility anchoring and handoff. For example, each CSR 121 may maintain a table or listing of UEs 102 connected thereto. In this manner, communications between UEs 102 connected to a same CSR 121 may be handled via intra-cell routing (e.g., between CSRs 121) without requiring transmission of data to EPC 106. In addition, during intra-ALD UE handoff from one CSR 121 to another CSR 121, the first CSR 121 may operate, during the handoff period, as an anchor point for receiving communications for the moving UE. In other words, data destined for the UE may be received at the initial CSR 121 and forwarded, e.g., via a tunnel, to the new CSR 121. In one implementation, this tunneling may be performed using IP in IP tunneling via the ALD 123 serving both the initial and new CSRs 121. Establishment of the IP in IP tunnel may be performed by MME 120, which notifies the first CSR 121 regarding the destination CSR 121 for creation of the tunnel.

In some implementations, CSR 121 may be integrated with or co-located with eNB 114. In such an embodiment, each eNB 114 in network 100 may be configured to support intra-cell site routing and mobility management functions.

MME 120 hosts the functions for NAS signaling, NAS signaling security, idle mode UE reachability, tracking area list management, roaming, authentication, and initiating the establishment of EPS bearers between SGWs and PGWs and between SGWs and eNBs.

ALD 123 hosts functions relating to UE IP address allocation, inter-region IP mobility anchoring (e.g., between ALDs 123) and regional policy enforcement. SGW 124 hosts functions for radio mobility anchoring. PGW 128 hosts functions for packet filtering, and lawful interception. In some implementations, functions of ALD 123 may be integrated into other devices in network 100, such as PGW 128, etc.

Figure 3:
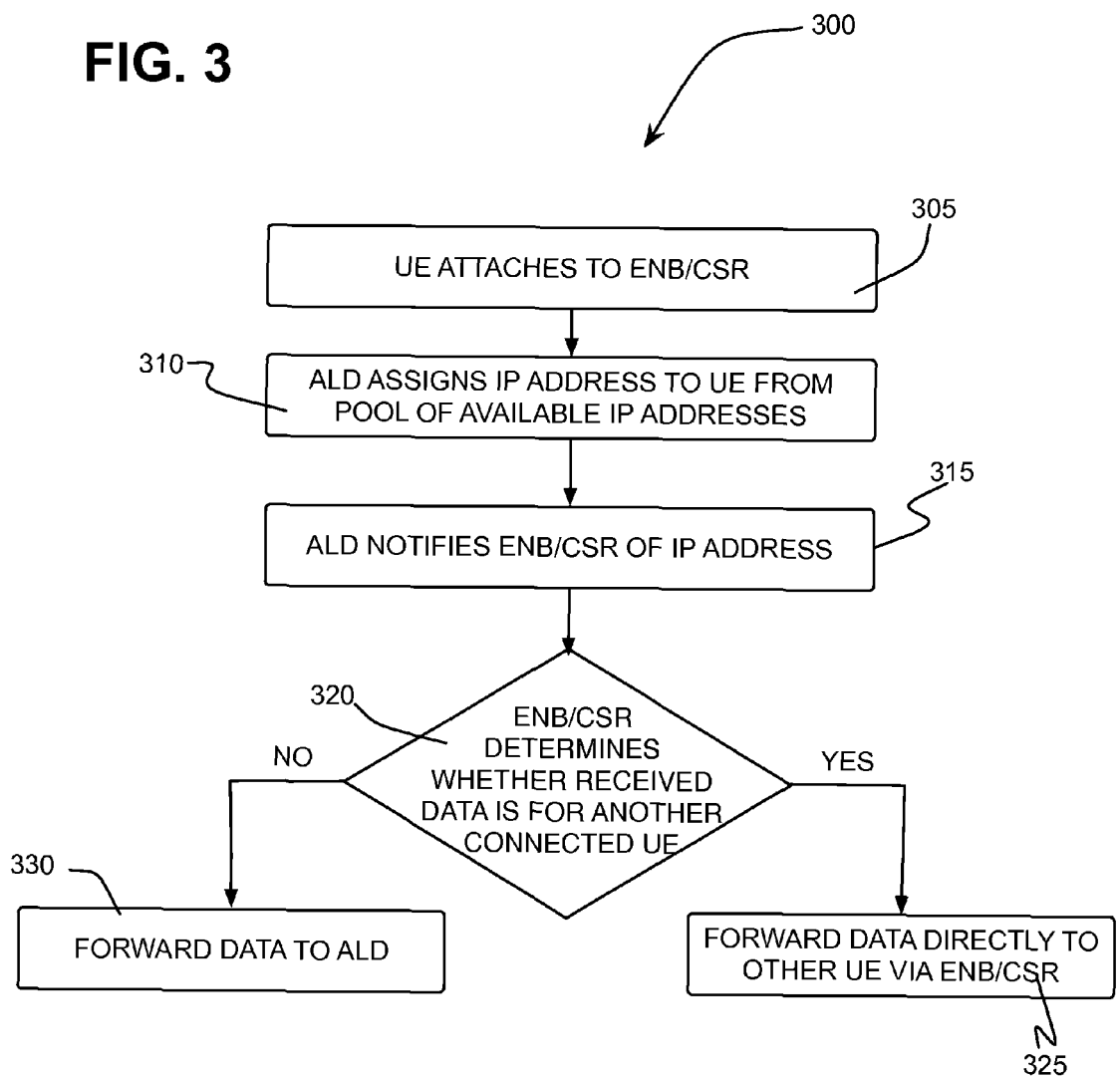
FIG. 3 is a flow diagram of an exemplary process for performing intra-CSR (Cell Site Routing) level routing in the LTE network of FIG. 1 consistent with embodiments described herein.

FIG. 3 is a flow diagram of an exemplary process 300 for performing intra-CSR level routing in network 100 consistent with embodiments described herein. Initially, UE 102 may attach to an eNB 114/CSR 121 (block 305). For example, processing may begin when UE 102 powers up or activates its cellular radio and receives information, such as tracking area identification (ID) information, network ID information, cell ID information, etc. from one or more eNBs 114 and identifies possible eNBs 114 to attach to based on the information. UE 102 then performs synchronization with a particular eNB 114 and establishes radio bearers, etc. In some implementations, UE 102 may perform initial communications with more than on eNB 114/CSR 121. In such circumstances, metrics information regarding UE 102 and eNB 114/CSR 121 may be passed to MME 120 (e.g., via ALD 123). MME 120 may use the received information to determine an optimal eNB 114/CSR 121 for attaching UE 102.

In any event, once UE 102 initially attaches to eNB 114/CSR 121, ALD 123 may assign an IP address to 102 from a pool of available IP addresses associated with ALD 123 (block 310). As briefly described above, each ALD 123 in network 100 may be associated with a particular pool or range of IP addresses for allocating to UEs 102 attaching to eNBs 114/CSRs 121 in its region. For example, ALD 123 may include or may be associated with one or more DHCP server devices for receiving IP address requests from UE 102 via eNB 114/CSR 121 and responding with a particular IP address from the pool.

Consistent with implementations described herein, ALDs 123 may communicate with MME 120, PCRF 126, and HSS/AAA 122 to obtain policy and subscriber information relating to UE 102. For example, such policy and subscriber information may include service level agreement (SLA) information, billing policy information, etc.

Once assigned, ALD 123 may notify eNB 114/CSR 121 regarding the IP address of the attached UE 102 (block 315). This process occurs for all attached UE's, thereby providing eNBs 114/CSRs 121 with a listing or table of IP addresses assigned to all connected UEs. Subsequent data traffic destined to or from UE 102 may utilize the assigned IP address as either a destination or source IP address associated with the subscriber. In this manner, eNB 114/CSR 121 may make routing decisions for micro-region traffic, which may also be referred to as intra-CSR traffic. In some implementations, ALD 123 may also notify MME 120, PCRF 126, and/or HSS/AAA regarding the assigned IP address.

Consistent with embodiments described herein, upon receipt of data from UE 102-1, a particular eNB 114/CSR 121 (e.g., ENB 114-1 and CSR 121-1) may initially determine whether the received data is destined for an IP address associated with another UE (e.g., UE 102-2) connected to the same eNB/CSR (e.g., eNB 114-1/CSR 121-1) (block 320). If so (block 320-YES), the data is passed directly to UE 102-2 without traversing vertically within network 100, e.g., to ALD 123-1, SGW 124, or PGW 128 (block 325). Such intra-CSR routing may alleviate a load on backhaul network required to transmit for data traffic local to a particular eNB 114/CSR 121.

In some implementations, policies relating to the exchange of data at the micro-region (e.g., intra-CSR) level with respect to a particular UE 102 may be forwarded from ALD 123 to eNB 114/CSR 121 upon attachment of UE 102. Some policies may relate to the types of data permitted for intra-CSR transmission, whether information regarding such data is transmitted to PCRF 126, and HSS/AAA 122 for billing purposes, etc. For example, in some embodiments, intra-CSR data may be billed/charged at a reduced rate in comparison to non-intra-CSR data, thereby signifying the reduced "cost" of transmitting the data to its end destination.

If the data received from UE 102 is not destined to an IP address associated with another UE connected to eNB 114-1/CSR 121-1 (e.g., UE 102-2) (block 320-NO), the data is forwarded to ALD 123 for delivery via EPC 106 and PDN 110 (block 330).

Figure 4:
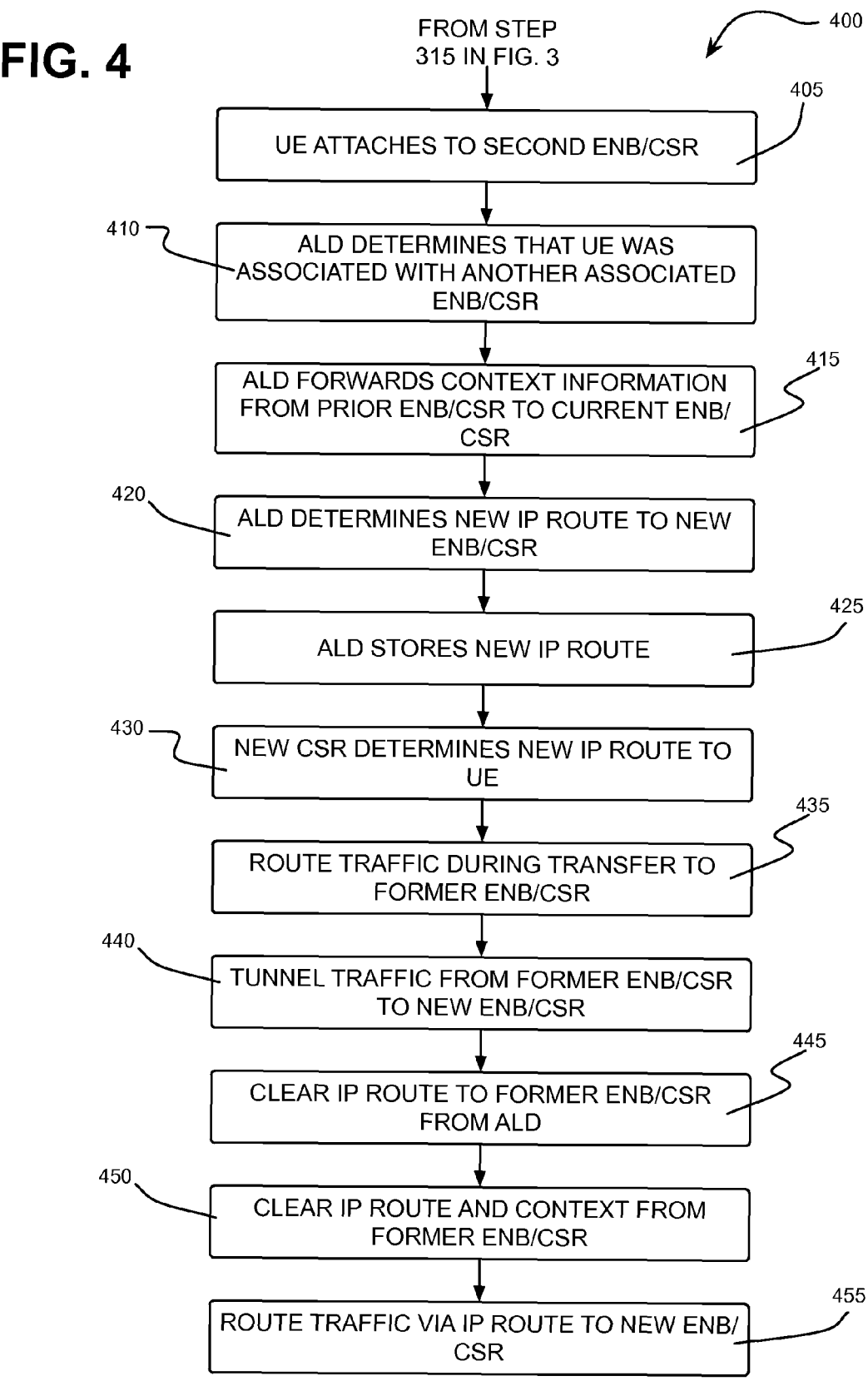
FIG. 4 is a flow diagram of an exemplary process for performing aggregation layer (i.e., micro-region) mobility in the LTE network of FIG. 1.

FIG. 4 is a flow diagram of an exemplary process 400 for performing aggregation layer (i.e., micro-region) mobility in network 100 consistent with embodiments described herein. In one embodiment, process 400 may begin upon notification of eNB 114/CSR 121 regarding the IP address of the attached UE 102 (e.g., block 315 in FIG. 3).

Next, UE 102 moves and attaches to a second eNB 114/CSR 121 associated with a common ALD 123 (block 405). For example, UE 102-1 may move from eNB 114-1/CSR 121-1 to eNB 114-2/CSR 121-2, each of which are associated with (e.g., serviced by) ALD 123-1. In response to the move, ALD 123-1 may be configured to transfer the UE context at first eNB 114/CSR 121 (e.g., eNB 114-1/CSR 121-1) to second eNB 114/CSR 121 (e.g., eNB 114-2/CSR 121-2) to ensure uninterrupted transmission of data to/from UE 102. As used herein, the phrase "UE context" refers to information relating to the UE's attachment to ALD 123 and network 100, such as assigned IP address, routing policies, etc.

More specifically, upon attachment of UE 102 to eNB 114-2/CSR 121-2, MME 120 may first determine whether UE 102 was previously associated with a different eNB 114/CSR 121 associated with ALD 123 (block 410). That is, MME 120 may determine whether UE 102 has moved within the micro-region, whether UE 102 has initially attached in the micro-region, or whether UE 102 has moved into the micro-region from another micro-region, such as a micro-region associated with ALD 123-2.

Assume for the purposes of this example, that MME 120 determines that UE 102 has moved within the micro-region from eNB 114-1/CSR 121-1 to eNB 114-2/CSR 121-2. Next, MME 120 may initiate forwarding of context information associated with UE 102, such as policy information, IP address information, etc. from prior eNB 114/CSR 121 to the new eNB 114/CSR 121 (block 415). Consistent with embodiments described herein, such UE context information may be minimized to include information which is relevant to the eNB 114/CSR 121. Other UE-related information, such as micro-region routing policies, etc. may be maintained at ALD 123 and may not be forwarded to respective eNBs 114/CSRs 121. In some implementations, ALD 123 may maintain a connection to PCRF 126 and/or HSS/AAA 122 relating to UEs in its region. In this manner, ALD 123 may act as an effective PCRF proxy in relation to eNBs 114/CSRs 121.

ALD 123 may determine a new IP route to direct traffic to UE 102 via the new eNB 114/CSR 121 (block 420). The new IP route may be stored in ALD 123 for use in handling subsequent traffic destined for UE 102 (block 425). In addition, the new CSR 121 may also determine a new IP route between itself and UE 102 for handling downstream traffic to UE 102 from ALD 123 (block 430).

As described above with respect to FIG. 3, intra-cell routing may be handled by CSR 121. Accordingly, the IP route configured between CSR 121 and UE 102 may also be used for intra-cell routing of data between devices connected to a common eNB 114/CSR 121.

Returning to FIG. 4, during transition from the former eNB 114/CSR 121 to the new eNB 114/CSR 121, continual UE connectivity must be maintained to avoid loss of data. In one embodiment, traffic may be routed by ALD 123 to former eNB 114/CSR 121 during the transition (block 435). Because UE has attached to new eNB 114/CSR 121, former eNB 114/CSR 121 forwards the traffic to new eNB 114/CSR 121 via a tunnel (block 440). In one implementation, the tunnel may include an IP-in-IP tunnel. The established tunnel traverses ALD 123 to route data from the initial eNB 114/CSR 121 to the new eNB 114/CSR 121.

Once transition from the former eNB 114/CSR 121 has been completed, the IP route to the former eNB 114/CSR 121 is cleared from ALD 123 (block 440) and the UE context similarly removed from the former eNB 114/CSR 121 (block 445). Consistent with embodiments described herein, removal of the IP route and UE context may be performed following expiration of a particular time interval, to ensure that all traffic in transit is properly routed. All subsequent traffic is routed directly to the new eNB 114/CSR 121 and on to UE 102 via the established IP route. All policies are implemented at ALD 123 and the new eNB 114/CSR 121.

Figure 5:
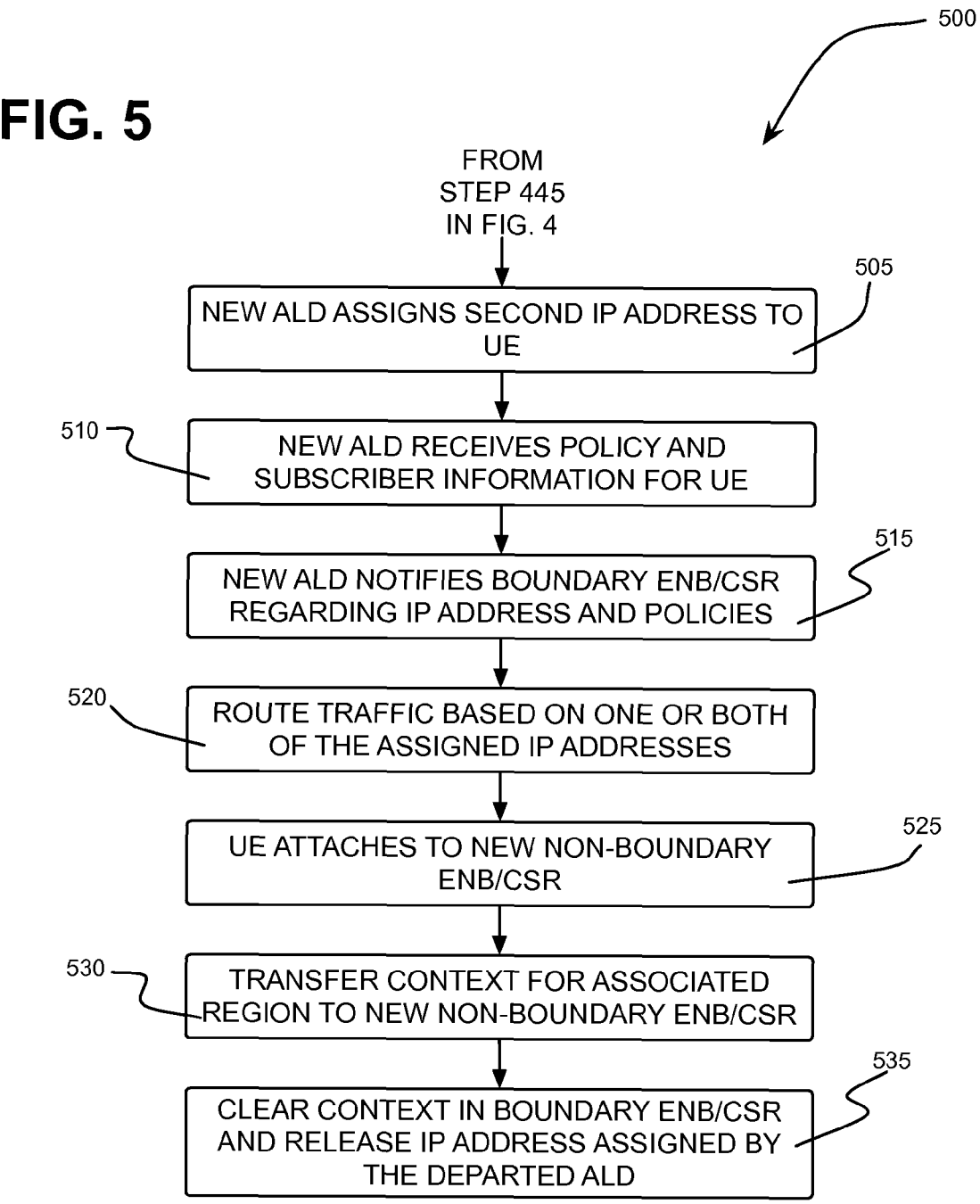
FIG. 5 is a flow diagram of an exemplary process for performing inter-ALD (Aggregation Layer Device) mobility in the LTE network of FIG. 1.

FIG. 5 is a flow diagram of an exemplary process 500 for performing inter-ALD (e.g., between aggregation regions) mobility in network 100 consistent with embodiments described herein. In one embodiment, process 500 may begin upon context transfer to a new eNB 114/CSR 121 and subsequent removal or teardown of prior context information in a former eNB 114/CSR 121 (e.g., block 445 in FIG. 4).

Consistent with implementations described herein, assume that the new eNB 114/CSR 121 (referred to herein as a boundary eNB 114/CSR 121) is on a boundary between an aggregation region serviced by or associated with the initial ALD 123 (e.g., ALD 123-1) and an aggregation region serviced by a new ALD 123 (e.g., ALD 123-2).

As described herein, ALD 123 (e.g., both initial ALD 123-1 and second ALD 123-2) may be associated with the new eNB 114/CSR 121 and each may operate in parallel with respect to eNB 114/CSR 121, to assign unique IP addresses to UEs 102 attached to the eNB 114/CSR 121.

Accordingly, since UE 102 has already received an IP address from initial ALD 123 (exchanged with boundary eNB 114/CSR 121 during context transition), new ALD 123 (e.g., ALD 123-2) may assign a second IP address to UE 102 from its pool of available IP addresses (block 505). As briefly described above, each ALD 123 in network 100 may be associated with a unique pool or range of IP addresses for allocating to UEs 102 attaching to eNBs 114/CSRs 121 within its region.

Consistent with implementations described herein, upon communication with and assignment of an IP address to UE 102, the new ALD 123 (e.g., ALD 123-2) may also (similar to processing already performed by ALD 123-1) communicate with MME 120, PCRF 126, and HSS/AAA 122 to obtain policy and subscriber information relating to UE 102 (block 510). For example, such policy and subscriber information may include service level agreement (SLA) information, billing policy information, etc.

Once assigned, the ALD 123 may notify the boundary eNB 114/CSR 121 regarding the assigned IP address of the attached UE 102 and any other relevant information relating to policies or routing information (e.g., received from MME 120, PCRF 126, and/or HSS/AAA 122) (block 515).

Subsequent data traffic to and from UE 102 may be based on one or both of the available IP addresses (block 520). For example, IP traffic based on the IP address assigned by the initial ALD 123 (e.g., ALD 123-1) would traverse the aggregation region associated with ALD 123-1 and IP traffic based on the IP address assigned by the new ALD 123 (e.g., ALD 123-2) would traverse the aggregation region associated with ALD 123-2.

In one implementation, decisions regarding which IP address to use may be performed by UE 102 and/or boundary eNB 114/CSR 121 based on application level requirements. For example, an IP address decision may be based on geographic location information (e.g., GPS information) associated with UE 102, such as whether UE 102 is traveling toward or away from a particular aggregation region. In another embodiment, radio signal strength associated with the various eNBs 114 may be used as the basis for such a decision. For example, when radio signals from eNBs in one aggregation region are stronger, the IP address associated with that region may be used. In other implementations, communication sessions based on one of the assigned IP addresses may be maintained using that particular IP address, to avoid any loss of connectivity resulting from a change of IP address in mid-session. Examples may include video or audio streams, IP telephony sessions, game sessions, etc.

In block 525, it may be determined that UE 102 has attached to a new, non-boundary eNB 114/CSR 121 that is associated with one (but not both) of ALDs 123-1 and 123-2. In response, the UE context for the particular aggregation region is transferred to the new eNB 114/CSR 121 as described above in relation to FIG. 4 (block 530). The UE context at the boundary eNB 114/CSR 121 is cleared and the IP address of the departed aggregation region is released back to the pool (block 535). Subsequent data traffic to and from UE 102 is made based only on the IP address associated with the current aggregation region.

Figure 6:
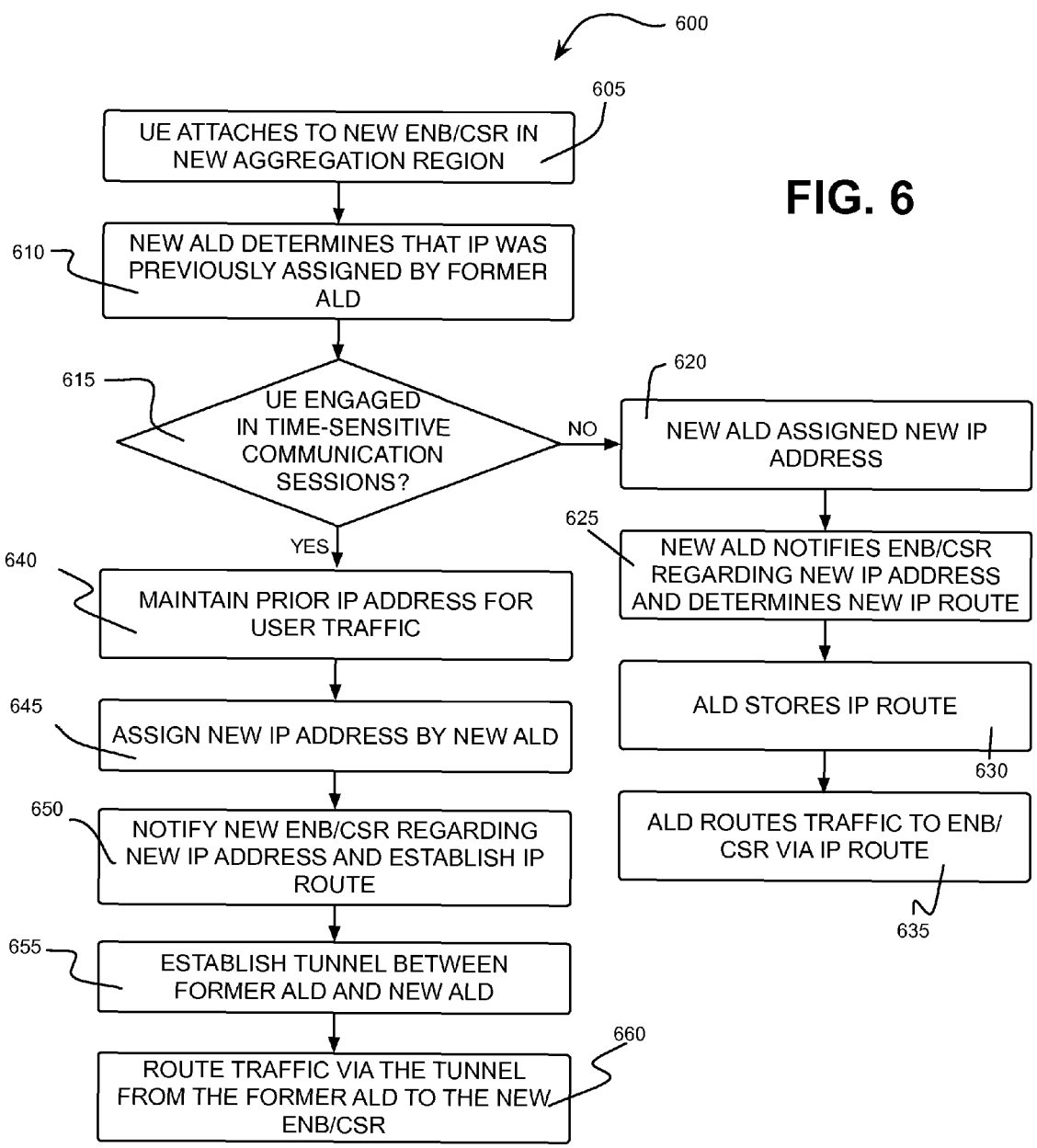
FIG. 6 is a flow diagram of another exemplary process for performing inter-ALD mobility in the LTE network of FIG. 1.

FIG. 6 is a flow diagram of another exemplary process 600 for performing inter-ALD (e.g., between aggregation regions) mobility in network 100 consistent with embodiments described herein. As described in detail below, in this implementation, a UE 102 with an assigned IP address may maintain the assigned IP address across aggregation regions (e.g., from one ALD 123 to another). Process 600 may begin upon attachment of UE 102 to a new eNB 114/CSR 121 associated with a new ALD 123 (e.g., ALD 123-2) (block 605).

Upon attachment to new eNB 114/CSR 121, the new ALD 123 determines whether an IP address has been previously assigned to UE 102 (block 610). For example, new ALD 123 may query UE 102 during attachment to eNB 114/CSR 121. In other implementations, MME 120 may maintain IP address assignment information regarding each in-service UE 102. In such an implementation, new ALD 123 may query MME 120 regarding a currently assigned IP address associated with UE 102.

In any event, when new ALD 123 determines that an IP address has been previously assigned to UE 102, ALD 123 may determine whether any existing communication sessions would be disrupted by assignment of a new IP address and release of the previous IP address (block 615). For example, new ALD 123 may determine whether any active real-time sessions are in progress on UE 102, such as video or voice sessions, streaming audio, game playing sessions, etc. Modification of UE 102's IP address when these sessions are in progress may result in unacceptable losses or disruptions to users.

In one implementation, new ALD 123 may determine communication sessions based on session status information for UEs 102 maintained by MME 120, HSS/AAA 122, and/or PCRF 126. For example, upon establishment of a relevant communication session (e.g., gaming session, voice or IP session, streaming session, etc.), UE 102 may transmit a status notification message to MME 120 (or HSS 122 or PCRF 126) via eNB 114/CSR 123 and ALD 123 indicating that UE 102 is engaged in a real time or time sensitive data session. Similarly, termination of all such sessions on UE 102 may result in UE 102 transmitting an appropriate session termination notification message to MME 120.

During re-attachment to a new eNB 114/CSR 123 associated with a new ALD 123 (block 610), the ALD 123 may query MME 120 to determine whether such a session is ongoing (block 615). When ALD 123 determines that no real-time or time-sensitive data session are in progress (block 615—NO), the new ALD 123 may assign a new IP address to UE 102 from its pool of available IP addresses (block 620). As briefly described above, each ALD 123 in network 100 may be associated with a particular pool or range of IP addresses for allocating to UEs 102 attaching to eNBs 114/CSRs 121 in its region. New ALD 123 may also communicate with MME 120, PCRF 126, and HSS/AAA 122 to obtain policy and subscriber information relating to UE 102. In another implementation, new ALD 123 may communicate with prior ALD 123 to obtain such information. In this implementation, such communication with also notify prior ALD 123 to release the IP address formerly assigned to UE 102.

Once the new IP address has been assigned, new ALD 123 may notify new eNB 114/CSR 121 regarding the IP address of UE 102 and ALD 123 may determine an IP route to direct traffic to UE 102 via the new eNB 114/CSR 121 (block 625). The new IP route may be stored in new ALD 123 for use in handling subsequent traffic destined for UE 102 (block 630). Subsequent data traffic destined to or from UE 102 may utilize the newly assigned IP address as either a destination or source IP address associated with the subscriber (block 635).

Returning to block 615, when ALD 123 determines that one or more real-time or time-sensitive communication sessions are in progress (block 615—YES), the prior IP address assigned by former ALD 123 may be maintained for user traffic (block 640). To accommodate this, new ALD 123 may assigned a new IP address (from its pool of IP addresses) for use in tunneling data to and from the prior aggregation region, thereby maintain IP continuity (block 645). Once the new IP address has been assigned, new ALD 123 may notify new eNB 114/CSR 121 regarding the IP address of UE 102 and ALD 123 may determine an IP route to direct traffic to UE 102 via the new eNB 114/CSR 121 (block 650).

One or more tunnels may be established between the former ALD 123 and the new eNB 114/CSR 123 via the new ALD 123 based on the ALD 123 assigning the original IP address and the IP route stored by the new ALD 123 and associated with the currently attached eNB 114/CSR 121 (block 655). In one implementation, the tunnels may include one or more IP-in-IP tunnels. Traffic may then be routed by former ALD 123 to new eNB 114/CSR 121 via the new ALD 123 (block 660).

In one implementation, new ALD 123 may continually or periodically monitor a session status of UE 102 to determine whether the tunnels and original IP address need to be maintained. When any affected sessions have been terminated, the tunnels and prior IP address may be similarly terminated, and UE 102 may be updated to operated based exclusively on the newly assigned IP address associated with the new ALD 123. In this manner, network resources may be minimized and performance increased.

Collapsed Mobile Architecture

Figure 7:
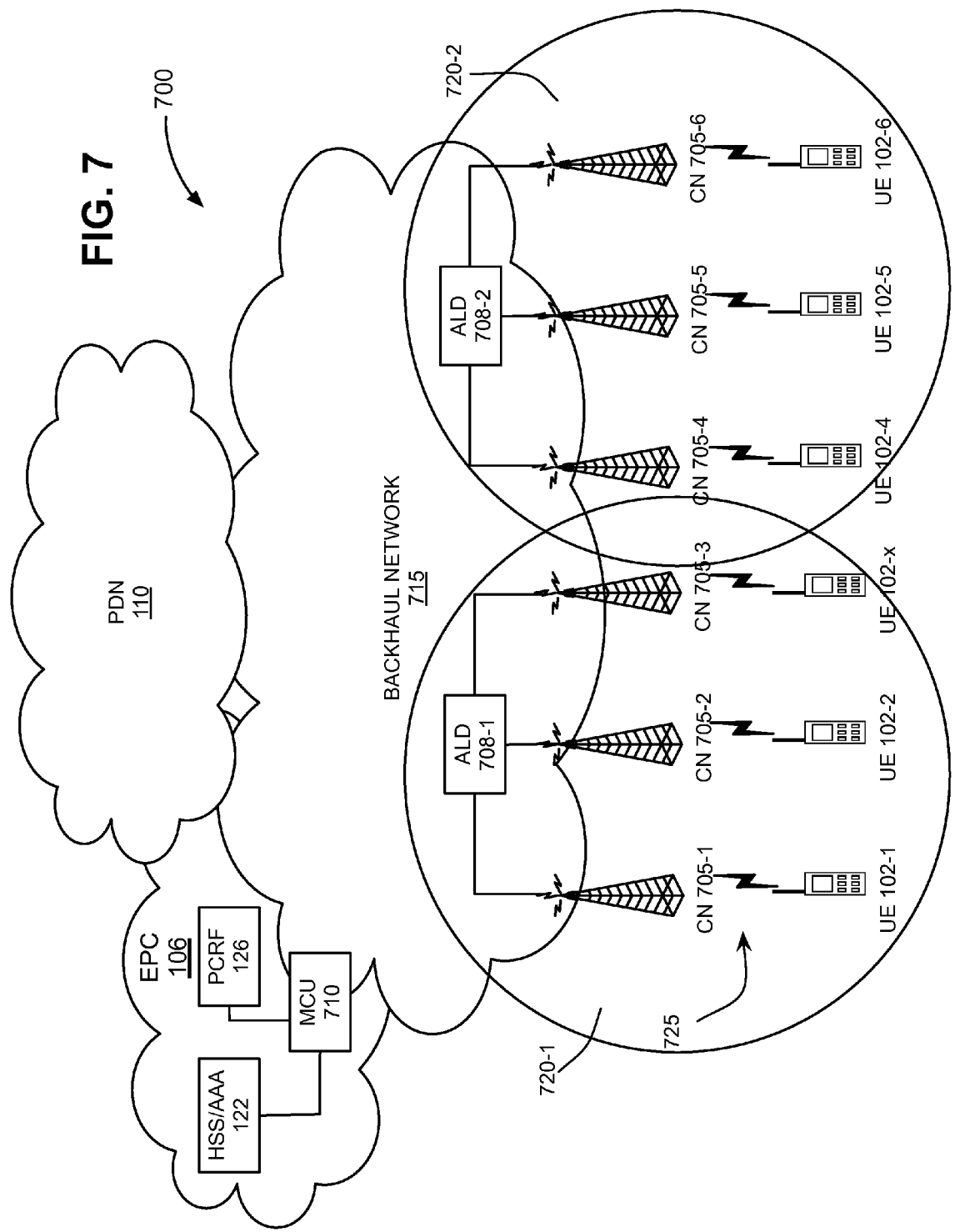
FIG. 7 is a diagram of an exemplary collapsed mobile architecture (CMA) network consistent with embodiments described herein.

Consistent with embodiments described herein, a novel network architecture is provided (hereinafter referred to as a "collapsed mobile architecture" (CMA)) in which a reduced number of components are necessary to provide high speed mobile connectivity, with greater efficiency and reduced cost. FIG. 7 is a diagram of an exemplary CMA network 700 consistent with embodiments described herein. As illustrated, CMA network 700 may include a number of UEs 102, a number of connection nodes (CNs) 705-1 to 705-3, ALDs 708-1 and 708-2, a mobility control unit (MCU) 710, an HSS device 122, a PCRF device 126, and a destination network PDN 110 (e.g., the Internet, a packet network, etc.) coupled together via a backhaul network 715, such as a multiprotocol label switching (MPLS) network. In contrast to LTE network 100 described above, CMA network 700 includes a single aggregation layer (e.g., ALDs 708) defining a number of aggregation regions 720 (e.g., aggregation region 720-1 associated with ALD 708-1 and aggregation region 720-2 associated with ALD 708-2), each including a number of CNs 705.

CMA network 700 is centered around the concept of multi-purpose connection nodes 705. Contrary to eNBs 114 and corresponding CSRs 121 described above, CNs 705 provide a distributed and direct IP user plane between PDN 110 and subscriber UEs 102 via backhaul network 715 that includes ALDs 708. CNs 705 also provide control plane connectivity to MCU 710, thereby enabling configuration and setup of simplified bearer sessions between devices in CMA network 700. For example, in contrast to LTE, CMA architecture requires that no GTP tunnels be established to support user plane creation and to effect transmission and receipt of IP data between PDN 110 and UE 102 (e.g., via one of ALDs 708). This allows for efficient routing of data and more seamless handovers between CNs 705 as UEs 102 move about the network, particular within individual aggregation regions 720. Moreover, the described CMA architecture provides improved support for multicast transmissions.

In some embodiments, CNs 705 may be implemented as base stations or access point devices connected to PDN 110, such as via an LTE backhaul (e.g., IP/MPLS network) 715. As described below, the backhaul network 715 may further enable CNs 705 to communicate directly with each other. CNs 705 are configured to connect with UEs 102 via a radio connection in some implementations. In other embodiments, CNs 705 may be connected to base station or access point devices (e.g., eNBs, picocells, femtocells, etc.) which communicate wirelessly with UEs 102. Consistent with embodiments described herein, such a radio connection may implement any of a number of available radio access technologies, such as WiFi, LTE (3GPP), WCDMA, CDMA, GSM, WiMax, etc. In this manner, CNs 705 may be access technology agnostic, with support for different access technologies being provided by line cards installed with each CN 705. In addition, other non-radio access technologies may also be implemented.

Similar to ALDs 123 described above with respect to FIG. 1, ALDs 708 may each be coupled to an associated number of CNs 705 and to EPC 106. For example, CNs 705-1, 705-2, and 705-3 are coupled to ALD 708-1 and CNs 705-4, 705-5, and 705-6 are coupled to ALD 708-2. ALDs 708 are configured to perform mobility management functions on a regional level, relative to EPC 106. For example, ALDs 708 may each include a DHCP server and an assigned pool of IP addresses for allocating to connected UEs 102. In addition, ALDs 708 may acquire routing policies relating to the subscriber, e.g., from PCRF 126 and may forward (in whole or in part) these policies to CNs 705 to assist in efficient routing of data and reduction in backhaul utilization.

Consistent with implementations described herein, ALDs 708 may support mobility handoff both at the micro-region level (e.g., between CNs 705 in a particular aggregation region 720) and between different ALDs 708. ALDs 708 may enable the transfer of UE contexts between CNs 705 and may dynamically configure aggregation layer routing information to effect such a handoff. In addition, ALDs 708 may support temporary CN anchoring and tunneling during handoff to minimize the possibility of data loss.

Figure 8:
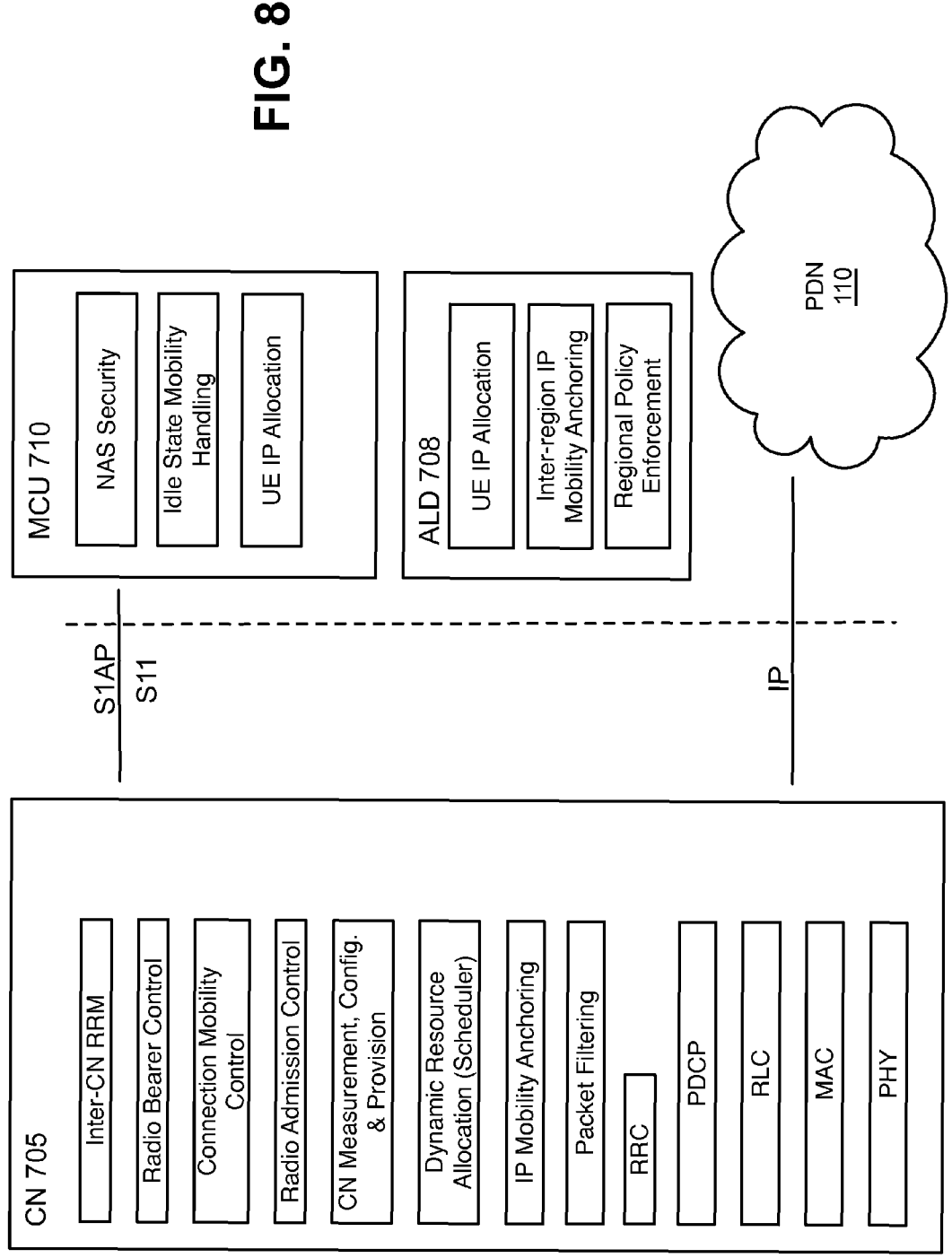
FIG. 8 is a block diagram showing an exemplary functional split between the Connection Nodes (CNs), the MCU, and the ALD in the CMA network of FIG. 7.

FIG. 8 is a block diagram showing an exemplary functional split between CN 705, ALD 708, and MCU 710 in CMA network 700. As shown, CNs 705 host functions for inter-CN radio resource management, Radio Bearer Control, Connection Mobility Control, Radio Admission Control, CN Measurement, Configuration, and Provisioning, and Dynamic allocation of resources to UEs in both uplink and downlink (scheduling). For example, CN 705 supports timing synchronization and the Random Access procedure to connect to UE 102. CN 705 also supports RRC signaling with UE 102 to establish an initial radio bearer between CN 705 and UE 102 and NAS signaling exchange between UE 102 and MCU 710 for use in authenticating UE 102 on the network and for acquiring an IP address for the UE 102.

Consistent with embodiments described herein, CN 705 also hosts functions for IP mobility anchoring, packet filtering, packet interception and mirroring, deep-packet inspection, among others. In addition, CN 705 may host functions that support inter-CN (e.g., micro-region) mobility, such as the routing of information from CN 705-1 to CN 705-2 in circumstances in which an IP session has been previously established through a first CN 705-1, and then moved to second CN 705-2. In addition, the CN will route traffic among UEs anchored at the same CN.

ALD 708 hosts functions relating to UE IP address allocation, inter-region IP mobility anchoring (e.g., between ALDs 708), regional policy enforcement, and IP route aggregation between EPC 106 and CNs 705.

MCU 710 hosts the functions for NAS signaling, NAS security, idle mode UE reachability, tracking area list management, roaming, and authentication. Some of these functions are similar to functions provided by MME in LTE network 100. More specifically, MCU 710 may provide functionalities relating to idle mode tracking and paging procedures (e.g., including retransmissions) for UE 102. For example, MCU 710 may maintain information regarding a current state of UE 102 (e.g., powered on, location, identification of current CN 705 or ALD 708 to which it is attached, etc.) based on NAS messages received from UE 102 via a CN 705 and/or ALD 708. In addition, MCU 710 may authenticate UE 102 (e.g., via interaction with HSS 122).

Furthermore, MCU 710 may be configured to check authorization of UE 102 to connect to a service provider's PLMN and may enforce roaming restrictions for UE 102. MCU 710 may also be a termination point in network 700 for ciphering/integrity protection for NAS signaling and may handle security key management.

Figure 9:
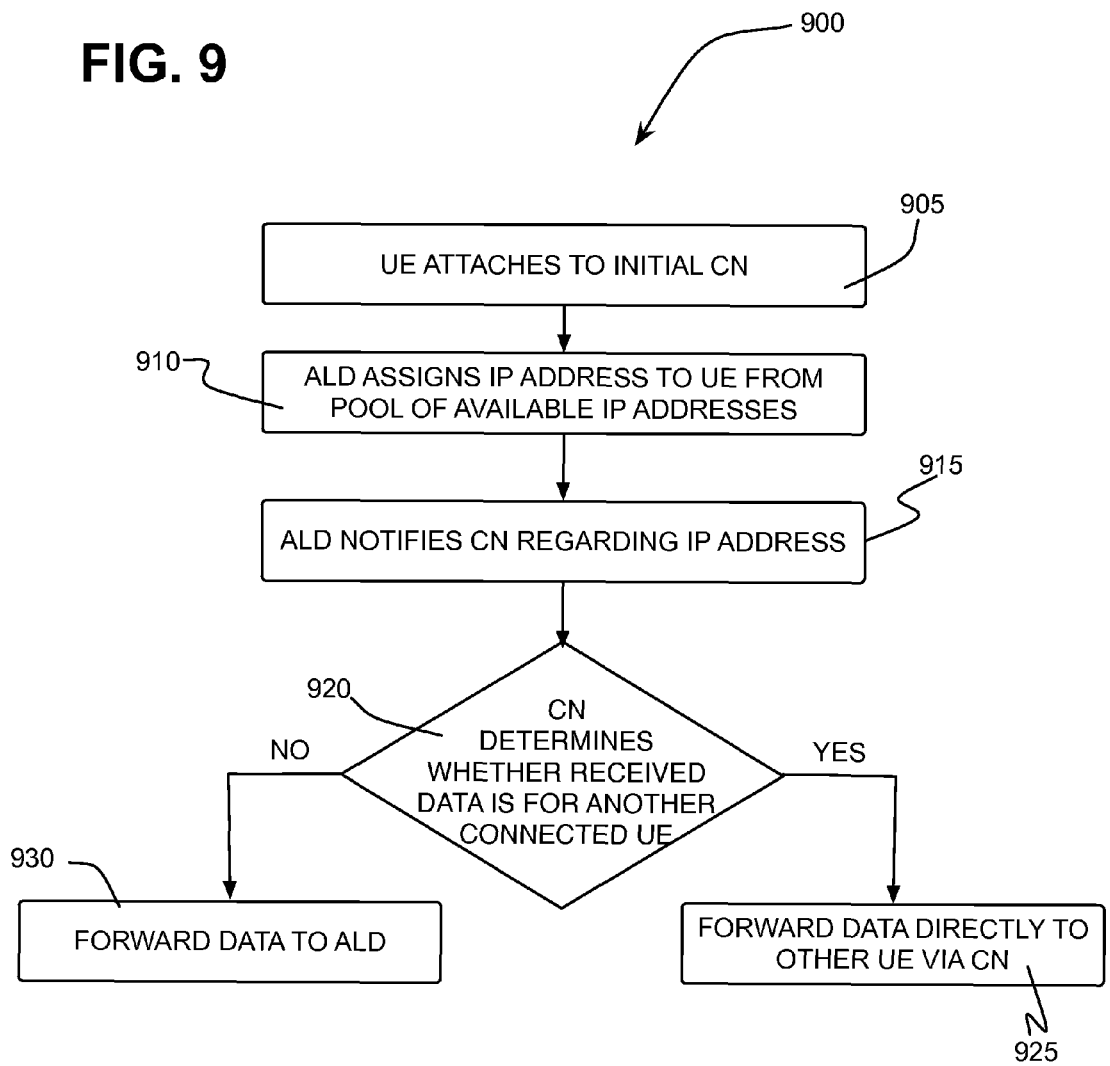
FIG. 9 is a flow diagram of an exemplary process for performing intra-CN level routing in the CMA network of FIG. 7 consistent with embodiments described herein.

FIG. 9 is a flow diagram of an exemplary process 900 for performing CN to CN level routing (also referred to as micro-region or sub-region routing) within network 700 consistent with embodiments described herein. Initially, UE 102 may attach to a CN 705 (block 905) (or to a radio base station or access point associated with CN 705). For example, processing may begin when UE 102 powers up or activates its cellular radio and receives information, such as tracking area identification (ID) information, network ID information, cell ID information, etc. from one or more CNs 705 and identifies possible CNs 705 to attach to based on the information. UE 102 then performs synchronization with a particular CN 705 and establishes radio bearers, etc. In some implementations, UE 102 may perform initial communications with more than one CN 705. In such circumstances, metrics information regarding UE 102 and CN 705 may be passed to MCU 710 (e.g., via the ALD 708 to which the particular CNs are attached). MCU 710 may use the received information to determine an optimal CN 705 for attaching UE 102.

In any event, once UE 102 initially attaches to a particular CN 705, the ALD 708 associated (e.g., connected to) CN 705 may assign an IP address to UE 102 from a pool of available IP addresses associated with ALD 708 (block 910). As briefly described above, in one embodiment, each ALD 708 in network 700 may be associated with a particular pool or range of IP addresses for allocating to UEs 102 attaching to CNs 705 in its corresponding aggregation region 720. For example, each ALD 708 may include or may be associated with one or more DHCP server devices for receiving IP address requests from UE 102 via CN 705 and responding with a particular IP address from the pool. In another implementation, ALD 708 may communicate with a DHCP server having IP address pools associated with each of a number of ALDs 708, e.g., coupled via backhaul network 715. In this implementation, the DHCP server may allocate an IP address to UE 102 associated with a particular ALD 708. The ALD 708 then forwards or relays the IP address to UE 102.

Consistent with implementations described herein, upon communication with and assignment of an IP address to UE 102, ALDs 708 may communicate with MCU 710, PCRF 126, and HSS/AAA 122 to obtain policy and subscriber information relating to UE 102. For example, such policy and subscriber information may include service level agreement (SLA) information, billing policy information, etc.

Once assigned, ALD 123 may notify CN 705 regarding the assigned IP address of the attached UE 102 (block 915). This process occurs for all attached UE's, thereby providing CN 705 with a listing or table of IP addresses assigned to all connected UEs. Subsequent data traffic destined to or from UE 102 may utilize the assigned IP address as either a destination or source IP address associated with the subscriber.

For example, CN 705 may forward IP data via any implemented transport layer or routing protocols in place. In the MPLS example, CN 705 may be configured to identify a destination address and/or protocol/port information from the IP data, determine an available label switched path (LSP) based on the destination address and protocol/port information, apply a label to the IP data based on the identified LSP and forward the IP data to a next hop label switching router (LSR) in backhaul network 715 for eventual delivery to PDN 110. In this manner, CN 705 may make routing decisions for micro-region traffic, which may also be referred to as intra-CSR traffic. In some implementations, ALD 708 may also notify MCU 710, PCRF 126, and/or HSS/AAA regarding the assigned IP address.

Consistent with embodiments described herein, upon receipt of data from UE 102-1, a particular CN 705 (e.g., CN 705-1 in aggregation region 720-1) may initially determine whether the received data is destined for an IP address associated with another UE 102 connected to the same CN 705 (block 920). If so (block 920-YES), the data is passed directly to UE 102-2 without traversing vertically within network 100, e.g., to ALD 708-1 or to backhaul network 715 (block 925). Such intra-CN routing may alleviate a load on backhaul network required to transmit for data traffic local to a particular CN 705.

In some implementations, policies relating to the exchange of data at the micro-region (e.g., intra-CN) level with respect to a particular UE 102 may be forwarded from ALD 708 to CN 705 upon attachment of UE 102. Some policies may relate to the types of data permitted for intra-CN transmission, whether information regarding such data is transmitted to PCRF 126, and HSS/AAA 122 for billing purposes, etc. For example, in some embodiments, intra-CN data may be billed/charged at a reduced rate in comparison to non-intra-CN data, thereby signifying the reduced "cost" of transmitting the data to its end destination.

If the data received from UE 102 is not destined to an IP address associated with another UE connected to CN 705-1 (block 920-NO), the data is forwarded upward within the network to ALD 708 for delivery via EPC 106 and PDN 110 (block 930).

Figure 10:
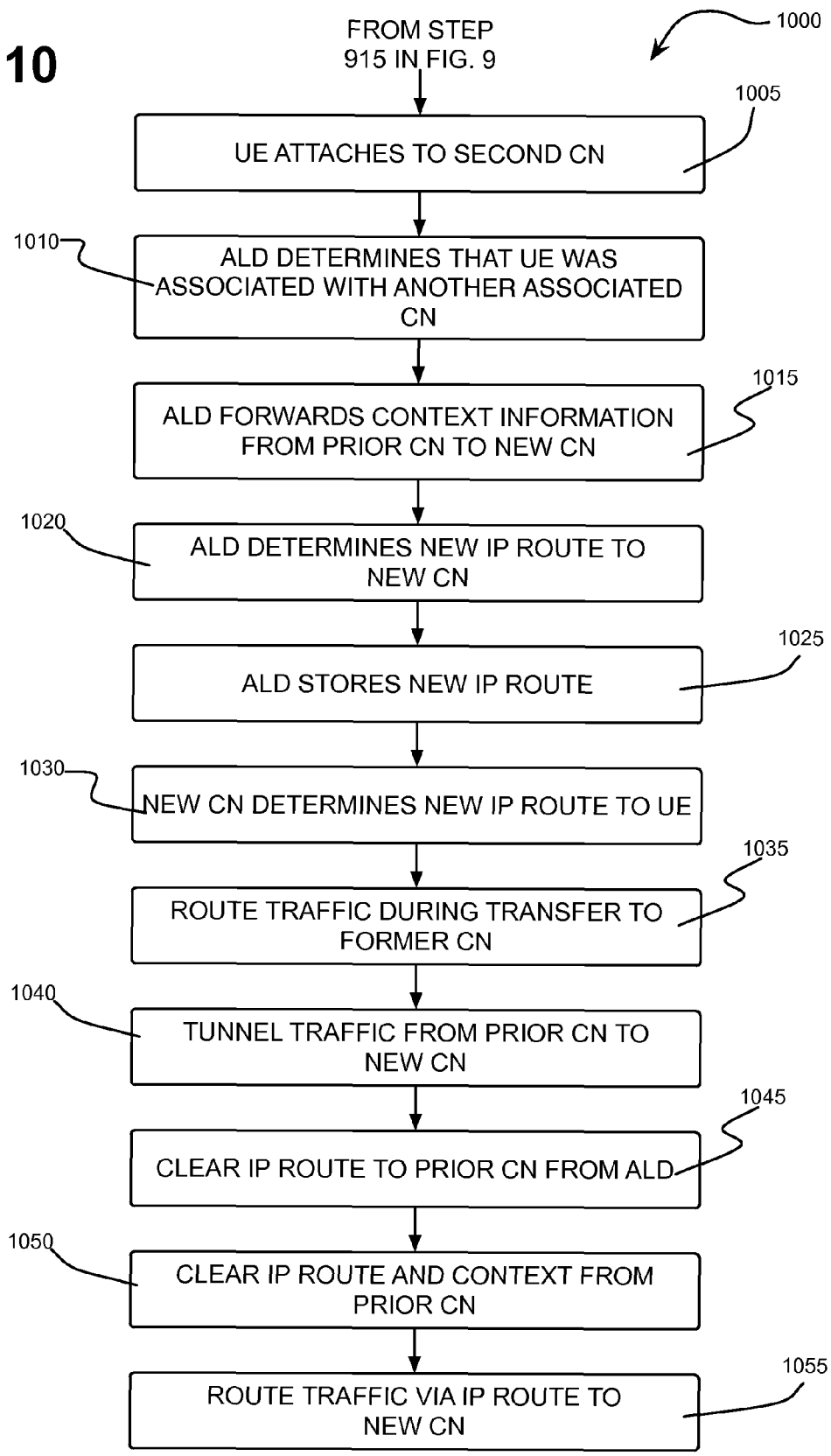
FIG. 10 is a flow diagram of an exemplary process for performing aggregation layer (i.e., micro-region) mobility in the CMA network of FIG. 7.

FIG. 10 is a flow diagram of an exemplary process 1000 for performing aggregation layer (i.e., micro-region) mobility in network 700 consistent with embodiments described herein. In one embodiment, process 1000 may begin upon notification of CN 705 regarding the IP address of the attached UE 102 (e.g., block 915 in FIG. 9).

Next, UE 102 moves and attaches to a second CN 705 associated with a common ALD 708 (block 1005). For example, UE 102-1 may move from CN 705-1 to CN 705-2, each of which are associated with (e.g., serviced by) 708-1. In response to the move, ALD 708-1 may be configured to transfer a UE context associated with UE 102-1 at CN 705-1 to new CN 705-2 to ensure uninterrupted transmission of data to/from UE 102. As described above, the phrase "UE context" refers to information relating to the UE's attachment to ALD 708 and network 700, such as assigned IP address, routing policies, status, etc.

More specifically, upon attachment of UE 102-1 to CN 705-2, MCU 710 may determine whether UE 102 was previously associated with a different CN 705 associated with ALD 708-1 (block 1010). That is, MCU 710 may determine whether UE 102 has moved within the aggregation region 720-1 associated with ALD 708-1, whether UE 102 has initially attached in aggregation region 720-1, or whether UE 102 has moved into aggregation region 720-1 from another aggregation region 720, such as aggregation region 720-2 associated with ALD 708-2.

Assume for the purposes of this example that MCU 710 determines that UE 102 has moved between CNs 705-1 and 705-2 within aggregation region 720-1. Next, MCU 710 initiates forwarding of context information associated with UE 102, such as policy information, IP address information, etc. from the former CN 705-1 to the new CN 705-2 (block 1015). Consistent with embodiments described herein, such UE context information may be minimized to include only that information which is relevant to the CN 705. Other UE-related information, such as aggregation region routing policies, etc. may be maintained at ALD 708 and may not be forwarded to respective CNs 705 during context exchange. In some implementations, ALD 708 may maintain a connection to PCRF 126 and/or HSS/AAA 122 relating to UEs in its region. In this manner, ALD 708 may act as an effective PCRF proxy in relation to CNs 705.

ALD 708 may determine a new IP route to direct traffic to UE 102 via the new CN 705 (e.g., CN 705-2) (block 1020). The new IP route may be stored in ALD 708 for use in handling subsequent traffic destined for UE 102 (block 1025). In addition, the new CN 705 may also determine a new IP route between itself and UE 102 for handling downstream traffic to UE 102 from ALD 708 (block 1030).

As described above with respect to FIG. 9, intra-CN routing may be handled by CN 705. Accordingly, the IP route configured between CN 705 and UE 102 may also be used for intra-CN routing of data between devices connected to a common CN 705.

Returning to FIG. 10, during transition from the former CN 705 (e.g., CN 705-1) to the new CN 705 (e.g., CN 705-2), continual UE connectivity should be maintained to avoid loss of data. In one embodiment, traffic may be routed by ALD 708 to the former CN 705 during the transition (block 1035). Because UE has attached to new CN 705 (e.g., CN 705-2), the former CN 705 (e.g., CN 705-1) forwards the traffic to new CN 705-2 via a tunnel (block 440). In one implementation, the tunnel may include an IP-in-IP tunnel. In some embodiments, such a tunnel may traverse ALD 708, while in other implementations, the tunnel may be provisioned directly between CNs 705.

Once transition from the former CN 705 has been completed, the IP route to the former CN 705 is cleared from ALD 708 (block 1040) and the UE context similarly removed from the former CN 705 (block 1045). Consistent with embodiments described herein, removal of the IP route and UE context may be performed following expiration of a particular time interval, to ensure that all traffic in transit to the prior CN 705 is properly routed. All subsequent traffic is routed directly to the new CN 705 and on to UE 102 via the established IP route. All policies are implemented at ALD 708 and the new CN 705.

Figure 11:
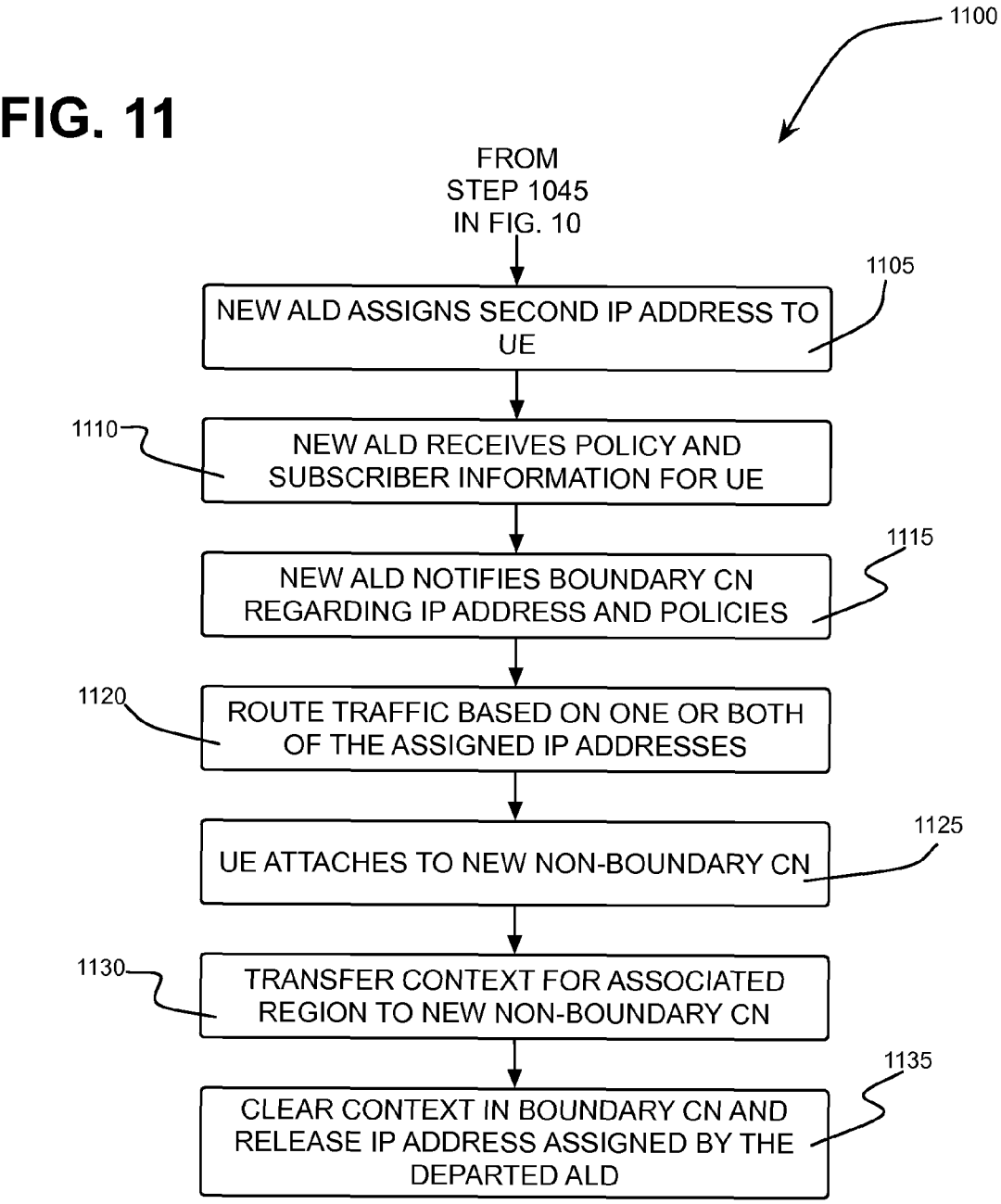
FIG. 11 is a flow diagram of an exemplary process for performing inter-ALD mobility in the CMA network of FIG. 7.

FIG. 11 is a flow diagram of an exemplary process 1100 for performing inter-ALD (e.g., between aggregation regions) mobility in network 700 consistent with embodiments described herein. In one embodiment, process 1100 may begin upon context transfer to a new CN 705 and subsequent removal or teardown of prior context information in a former CN 705 (e.g., block 1045 in FIG. 10).

Consistent with implementations described herein, assume that the new CN 705 (referred to herein as a boundary CN 705) is on a boundary between aggregation regions serviced by or associated with the initial ALD 708 (e.g., ALD 708-1) and a new ALD 708 (e.g., ALD 708-2), respectively.

As described herein, both ALD 708s (e.g., ALD 708-1 and ALD 708-2) may be connected to the boundary CN 705 and each may operate in parallel with respect to boundary CN 705, to assign unique IP addresses to UEs 102 attached to the boundary CN 705.

Accordingly, since UE 102 has already received an IP address from initial ALD 708 (exchanged with boundary CN 705 during context transition as described with respect to FIG. 10), new ALD 708 (e.g., ALD 708-2) may assign a second IP address to UE 102 from its pool of available IP addresses (block 1105).

New ALD 728 (e.g., ALD 728-2) may (similar to processing already performed by ALD 728-1) communicate with MCU 710, PCRF 126, and HSS/AAA 122 to obtain policy and subscriber information relating to UE 102 (block 1110). For example, such policy and subscriber information may include service level agreement (SLA) information, billing policy information, etc.

Once assigned, the new ALD 708 may notify the boundary CN 705 regarding the assigned IP address of the attached UE 102 and any other relevant information relating to policies or routing information (e.g., received from MCU 710, PCRF 126, and/or HSS/AAA 122) (block 1115).

Subsequent data traffic to and from UE 102 may be based on one or both of the available IP addresses (block 1120). For example, IP traffic based on the IP address assigned by the initial ALD 708-1 would traverse aggregation 720-1 and IP traffic based on the IP address assigned by the new ALD 708-2 would traverse aggregation region 720-2.

In one implementation, decisions regarding which IP address to use may be performed by UE 102 and/or boundary CN 705. For example, an IP address decision may be based on geographic location information (e.g., GPS information) associated with UE 102, such as whether UE 102 is traveling toward or away from a particular aggregation region 720. In other implementations, communication sessions based on one of the assigned IP addresses may be maintained using that particular IP address, to avoid any loss of connectivity resulting from a change of IP address in mid-session. Examples may include video or audio streams, IP telephony sessions, game sessions, etc.

In block 1125, it may be determined that UE 102 has attached to a new, non-boundary CN 705 that is associated with one (but not both) of ALDs 708-1 and 708-2. In response, the UE context for the particular aggregation region is transferred to the new CN 705 as described above in relation to FIG. 9 (block 1130). The UE context at the boundary CN 705 is cleared and the IP address of the departed aggregation region is released back to the pool (block 1135). Subsequent data traffic to and from UE 102 is made based only on the IP address associated with the current aggregation region.

Figure 12:
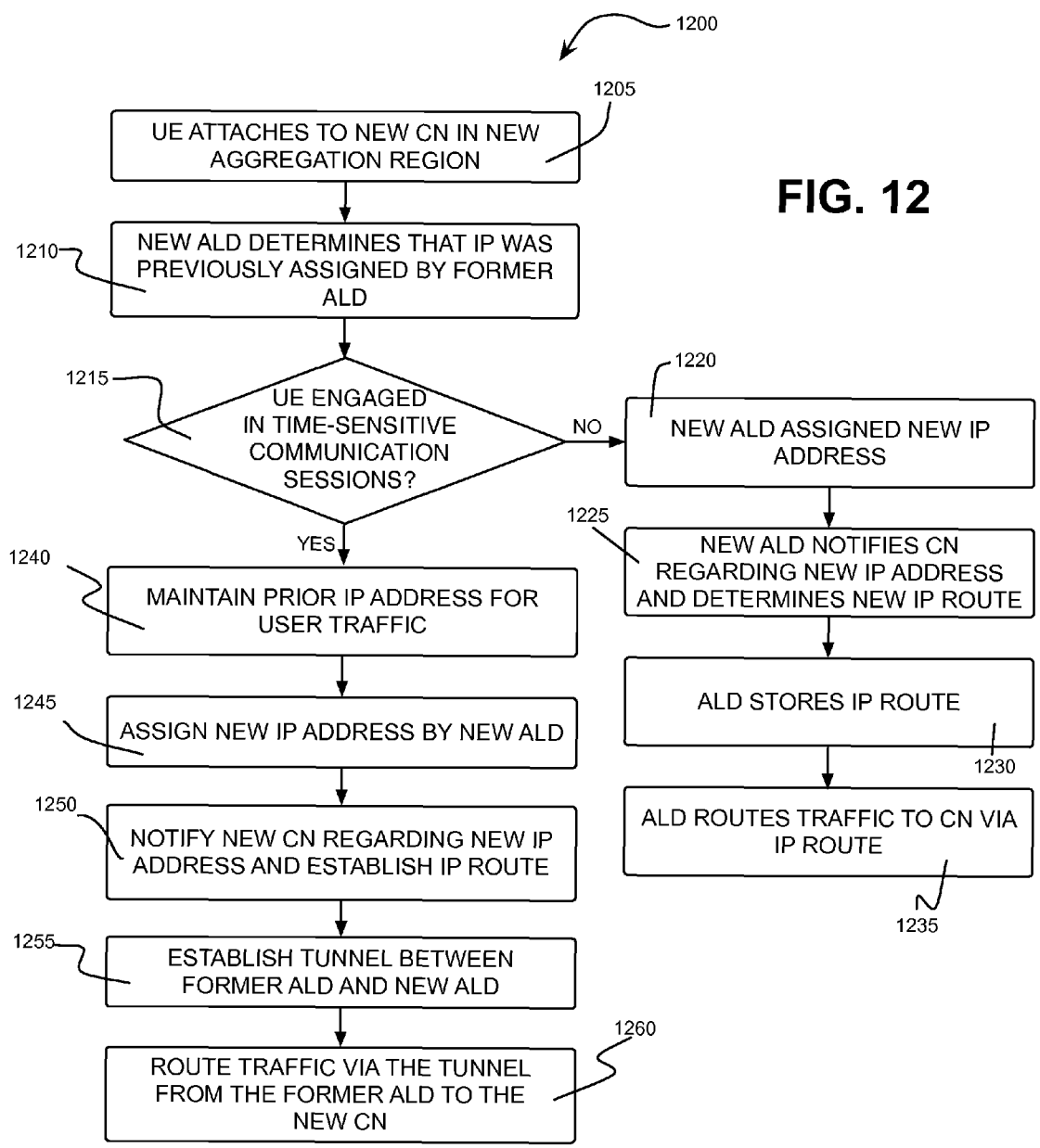
FIG. 12 is a flow diagram of another exemplary process for performing inter-ALD mobility in the CMA network of FIG. 7.

FIG. 12 is a flow diagram of another exemplary process 600 for performing inter-ALD (e.g., between aggregation regions) mobility in network 100 consistent with embodiments described herein. As described in detail below, in this implementation, a UE 102 with an assigned IP address may maintain the assigned IP address across aggregation regions (e.g., from one ALD 123 to another). Process 1200 may begin upon attachment of UE 102 to a new CN 705 associated with a new ALD 708 (e.g., ALD 708-2) (block 1205).

Upon attachment to new CN 705, the new ALD 708 determines whether an IP address has been previously assigned to UE 102 (block 1210). For example, new ALD 708 may query UE 102 during attachment to the new CN 705. In other implementations, MCU 710 may maintain IP address assignment information regarding each in-service UE 102. In such an implementation, new ALD 708 may query MCU 710 regarding a currently assigned IP address associated with UE 102.

In any event, when new ALD 708 determines that an IP address has been previously assigned to UE 102, the new ALD 708 may determine whether any existing communication sessions would be disrupted by assignment of a new IP address and release of the previous IP address (block 1215). For example, new ALD 708 may determine whether any active real-time sessions are in progress on UE 102, such as video or voice sessions, streaming audio, game playing sessions, etc. Modification of UE 102's IP address when these sessions are in progress may result in unacceptable losses or disruptions to users.

In one implementation, new ALD 708 may determine communication sessions based on session status information for UEs 102 maintained by MCU 710, HSS/AAA 122, and/or PCRF 126. For example, upon establishment of a relevant communication session (e.g., gaming session, voice or IP session, streaming session, etc.), UE 102 may transmit a status notification message to MCU 710 (or HSS 122 or PCRF 126) via CN 705 and ALD 708 indicating that UE 102 is engaged in a real time or time sensitive data session. Similarly, termination of all such sessions on UE 102 may result in UE 102 transmitting an appropriate session termination notification message to MCU 710.

During re-attachment to a new CN 705 associated with a new ALD 708 (e.g., block 1210), the ALD 708 may query MCU 710 to determine whether such a session is ongoing (block 1215). When ALD 708 determines that no real-time or time-sensitive data session are in progress (block 1215—NO), the new ALD 708 may assign a new IP address to UE 102 from its pool of available IP addresses (block 1220). As briefly described above, each ALD 708 in network 100 may be associated with a particular pool or range of IP addresses for allocating to UEs 102 attaching to CNs 705 in its region.

Upon communication with and assignment of an IP address to UE 102, new ALD 708 may, in one implementation, communicate with MCU 710, PCRF 126, and HSS/AAA 122 to obtain policy and subscriber information relating to UE 102. In another implementation, new ALD 708 may communicate with prior ALD 708 to obtain such information. In this implementation, such communication with also notify prior ALD 708 (e.g., ALD 708-1) to release the IP address formerly assigned to UE 102.

Once the new IP address has been assigned, new ALD 708 may notify new CN 705 regarding the IP address of UE 102 and ALD 123 may determine an IP route to direct traffic to UE 102 via the new CN 705 (block 1225). The new IP route may be stored in new ALD 708 for use in handling subsequent traffic destined for UE 102 (block 1230). Subsequent data traffic destined to or from UE 102 may utilize the newly assigned IP address as either a destination or source IP address associated with the subscriber (block 1235).

Returning to block 1215, when ALD 708 determines that one or more real-time or time-sensitive communication sessions are in progress (block 1215—YES), the prior IP address assigned by former ALD 708 may be maintained for some or all subsequent user traffic (block 1240). To accommodate this, new ALD 708 may be assigned a new IP address (from its pool of IP addresses) for use in tunneling data to and from the prior aggregation region, thereby maintain IP continuity (block 1245). Once the new IP address has been assigned, new ALD 708 may notify new CN 705 regarding the IP address of UE 102 and the new ALD 708 may determine a new IP route to direct traffic to UE 102 via the new CN 705 (block 650).

One or more tunnels may be established between the former ALD 708 (e.g., ALD 708-1) and the new CN 705 via the new ALD 708 (e.g., ALD 708-2) based on ALD 708 assigning the original IP address, the IP route stored by the new ALD 708 and associated with the currently attached CN 705, and the IP route stored by the former ALD 708 in relation to the prior CN 705 (block 1255). In one implementation, the tunnels may include one or more IP-in-IP tunnels. Traffic may then be routed by former ALD 708 to new CN 705 via the new ALD 708 (block 1260).

In one implementation, new ALD 708 may continually or periodically monitor a session status of UE 102 to determine whether the tunnels and original IP address need to be maintained (block 1265). When any affected sessions have been terminated, the tunnels and prior IP address may be similarly terminated, and UE 102 may be updated to operate based exclusively on the newly assigned IP address associated with the new ALD 123 (block 1270). In this manner, network resources may be minimized and performance increased.

As described herein, a high speed mobile network may include an intermediate aggregation layer for handling Internet Protocol (IP) mobility across aggregation regions and sub-regions in the network. For example, an aggregation layer network device, such as an aggregation layer router, may support regionalized IP address allocation and region-level IP routing for subscriber devices (referred to herein as user equipment (UE)) connected to the aggregation layer device. In addition, IP routing at the micro-region level may be supported by a number of micro-region routing devices, such as cell site routing devices (also referred to as connection nodes) associated or integrated with wireless base stations. Supporting both regional and micro-regional routing and policy enforcement allows for significant reductions in backhaul network bandwidth utilization.

The foregoing description of implementations provides illustration, but is not intended to be exhaustive or to limit the implementations to the precise form disclosed. Accordingly, modifications to the implementations described herein may be possible. For example, as previously described, the collapsed mobile architecture described herein may be implemented in networks other than LTE-based or even radio-based networks.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks has been described with regard to the processes illustrated in FIGS. 3-6 and 9-12, the order of the blocks or signals/messages may be modified in other implementations. Further, non-dependent blocks may be performed in parallel. Additionally, with respect to other processes described in this description, the order of operations may be different and/or operations may be performed in parallel according to other implementations.

It will be apparent that the embodiments described herein may be implemented in many different forms of software or firmware in combination with hardware in the implementations illustrated in the figures. The actual software code (executable by hardware) or specialized control hardware used to implement the device, method, and/or system does not limit the disclosure of the invention. Thus, the operation and behavior of the devices and/or systems, or the performing of the methods was described without reference to the specific software code—it being understood that software and control hardware can be designed to implement the device, method, and/or system based on the description herein.

Further certain features described above may be implemented as "logic" or a "component" that performs one or more functions. This logic or component may include hardware, such as one or more processors, one or more microprocessors, one or more ASICs, one or more FPGAs, etc., a combination of hardware and software, or a combination with firmware, etc.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

No element, act, or instruction used in the present application should be construed as critical or essential to the implementations described herein unless explicitly described as such.

What is claimed is:

1. A system, comprising:
   a plurality of connection nodes, each comprising an access interface and at least one network interface;
   a plurality of aggregation layer devices, each of which is coupled to respective sets of connection nodes to form aggregation regions,
   wherein each of the plurality of aggregation layer devices comprises an Internet Protocol (IP) address server associated with a pool of IP addresses for allocating to user devices connected to a connection node coupled to the aggregation layer device;
   a backhaul network coupled to each of the aggregation layer devices; and
   a mobility entity coupled to the backhaul network,
   wherein each of the connection nodes is configured to receive attachment requests from at least one user device,
   wherein the aggregation layer devices are configured to assign IP addresses, from the pool of IP addresses, to user devices connected to connection nodes coupled to the respective aggregation layer devices,
   wherein the aggregation layer devices are configured to determine IP routes from the backhaul network to the connection nodes based on the assigned IP addresses; and
   wherein the aggregation layer devices are further configured to notify respective connection nodes regarding the IP addresses assigned to connected user devices.

2. The system of claim 1, wherein the IP address server comprises a dynamic host control (DHCP) server that assigns IP addresses from the pool of IP addresses.

3. The system of claim 1, wherein the backhaul network comprises a multiprotocol label switching (MPLS) network or a native IP network.

4. The system of claim 1, wherein the backhaul network is coupled to a packet data network.

5. The system of claim 1, wherein the mobility entity is further configured to perform authentication and registration of the at least one user device based on the attachment request.

6. The system of 1, wherein the access interface comprises a radio interface and wherein the at least one network interface comprises an Ethernet interface.

7. The system of claim 1, wherein the plurality of connection nodes are configured to:
   determine whether traffic received at the respective connection node from a first user device is destined for a second user device also coupled to the respective connection node;
   forward the traffic directly to the second user device when the second user device is also coupled to the respective connection node; and
   forward the traffic to an associated aggregation layer device when the second user device is not coupled to the respective connection node.

8. The system of claim 1, wherein, when a particular user device moves from a first connection node in a particular aggregation region to a second connection node in the particular aggregation region, the associated aggregation layer device is configured to:
   forward context information associated with the particular user device and the first connection node to the second connection node,
   wherein the context information includes at least the IP address assigned to the user device;
   determine a new IP route for the particular user device to the second connection node; and
   forward traffic for the particular user device to the second connection node via the new IP route.

9. The system of claim 8, wherein, during a transition period, when the particular user device moves from the first connection node in the particular aggregation region to the second connection node in the particular aggregation region, the associated aggregation layer device is further configured to route traffic for the particular user device to the first connection node via an initial IP route, and
   wherein, during the transition period, the first connection node is configured to forward the traffic for the particular user device to the second connection node.

10. The system of claim 9, wherein the first connection node is configured to forward the traffic for the particular user device to the second connection node via a tunnel.

11. The system of claim 8, wherein, following forwarding of the context information to the second connection node, the context information is removed from the first connection node.

12. The system of claim 1, further comprising:
   a boundary connection node, wherein the boundary connection node is coupled to each of a first aggregation layer device in a first aggregation region and a second aggregation layer device in a second aggregation region;

wherein, when a particular user device moves from a first connection node in the first aggregation region to the boundary connection node, the second aggregation layer device is configured to:

assign a second IP address to the particular user device;

determine an IP route from the backhaul network to the boundary connection node based on the second IP address; and notify the boundary connection node regarding the second IP address; and wherein the particular user device is configured to transmit traffic using either of a first IP address assigned by the first aggregation layer device or the second IP addresses assigned by the second aggregation layer device.

13. The system of claim 12, wherein the particular user device is configured to transmit traffic using either the first IP address or the second IP address based on geographic location information associated with the particular user device.

14. The system of claim 1, wherein, when a particular user device moves from a first connection node in a first aggregation region to a second connection node in a second aggregation region, a second aggregation layer device in the second aggregation region is configured to:

determine whether the particular user device is engaged in at least one time-sensitive communication session;

when it is determined that the particular user device is engaged in at least one time-sensitive communication session, the second aggregation layer device is further configured to:

assign a new IP address to the particular user device;

establish a new IP route to the second connection node based on the new IP address;

notify the second connection node regarding the new IP address;

establish a tunnel with a first aggregation layer device in the first aggregation region; and wherein the first aggregation layer device is configured to forward traffic for the particular user device to the second aggregation layer device via the tunnel; and wherein the second aggregation layer device is configured to forward the traffic received via the tunnel to the second connection node via the new IP route.

15. The system of claim 14, wherein, when it is determined that the particular user device is not engaged in at least one time-sensitive communication session, the second aggregation layer device is further configured to:

assign the new IP address to the particular user device;

establish an IP route to the second connection node based on the new IP address; and notify the second connection node regarding the new IP address assigned to the particular user device, and wherein the first aggregation layer device is further configured to release a first IP address assigned to the particular user device into a pool of available IP addresses.

16. The system of claim 14, wherein the second aggregation layer device is configured to determine whether the particular user device is engaged in at least one time-sensitive communication session based on status information associated with the particular user device maintained by the mobility entity.

17. A method, comprising:

receiving, at a connection node, an attachment request from a user equipment (UE) via an access technology;

forwarding, by the connection node, information regarding the UE to a mobility entity via a particular aggregation layer device, wherein the particular aggregation layer device is one of a plurality of aggregation layer devices, each of which is associated with respective sets of connection nodes, wherein the plurality of aggregation layer devices each includes an Internet Protocol (IP) server associated with a pool of IP addresses for allocating to UEs connected to one of a plurality of connection nodes coupled to the respective aggregation layer device, and wherein the plurality of aggregation layer devices assign IP addresses, from the pools of IP addresses, to the UEs connected to the plurality of connection nodes coupled to the respective aggregation layer device and determine routes to a backhaul network coupled to each of the aggregation layer devices based on the assigned IP addresses;

receiving, by the connection node, an IP address assigned to the UE by the particular aggregation layer device; and notifying, by the connection node, the UE regarding the assigned IP address.

18. The method of claim 17, further comprising:

determining, by the connection node, whether traffic received at the connection node from the UE is destined for a second UE also coupled to the connection node;

forwarding the traffic, by the connection node, directly to the second UE when the second UE is also coupled to the connection node; and forwarding the traffic to the particular aggregation layer device when the second UE is not coupled to the connection node.

19. The method of claim 17, further comprising:

receiving, at a second connection node, an attachment request from the UE via the access technology, wherein the second connection node is also associated with the particular aggregation layer device;

forwarding, by the particular aggregation layer device, UE context information associated with the UE and the connection node to the second connection node;

wherein the UE context information includes at least the IP address assigned to the UE;

determining a new IP route for the UE to the second connection node; and forwarding traffic for the UE to the second connection node via the new IP route.

20. The method of claim 19, wherein, during a transition period, the method further includes:

routing traffic for the UE, by the particular aggregation layer device, to a first connection node via an initial IP route, and forwarding, by the connection node, the traffic for the UE to the second connection node.

21. The method of claim 17, further comprising:

receiving, at a boundary connection node, an attachment request from the UE via the access technology, wherein the boundary connection node is connected to each of the particular aggregation layer device and a new aggregation layer device;

assigning, by the new aggregation layer device, a second IP address to the UE;

determining, by the new aggregation layer device, a second IP route to the boundary connection node based on the second IP address;

notifying the boundary connection node regarding the second IP address, by the new aggregation layer device;

notifying the UE regarding the second IP address, by the boundary connection node; and transmitting traffic, by the UE, using either of the IP address assigned by the particular aggregation layer device or the second IP addresses assigned by the new aggregation layer device.

22. The method of claim 17, further comprising:

receiving an attachment request from the UE via the access technology at a second connection node associated with a second aggregation layer device;

determining, by the second aggregation layer device, that the UE is engaged in at least one time-sensitive communication session based on status information associated with the UE maintained by the mobility entity;

assigning a new IP address to the UE;

establishing a new IP route to the second connection node based on the new IP address;

notifying the second connection node regarding the new IP address;

establishing, by the second aggregation layer device, a tunnel with the particular aggregation layer device;

forwarding, by the particular aggregation layer device, traffic for the UE to the second aggregation layer device via the tunnel; and forwarding, by the second aggregation layer device, the traffic received via the tunnel to the second connection node via the new IP route.

23. A non-transitory computer-readable medium having stored thereon sequences of instructions which, when executed by at least one processor, cause the at least one processor to:

receive, at a connection node, an attachment request from a user device via an access technology;

forward information regarding the user device to a mobility entity via an aggregation layer device, wherein the aggregation layer device is one of a plurality of aggregation layer devices, each of which is associated with respective sets of connection nodes, and wherein each aggregation layer device assigns Internet Protocol (IP) addresses, from a pool of IP addresses, to user devices connected to a connection node of the set of connection nodes associated with the respective aggregation layer device and determines routes to a backhaul network coupled to each of the aggregation layer devices based on the assigned IP addresses;

receive, from the aggregation layer device, user device context information associated with the user device and a prior connection node to which the user device was connected, wherein the prior connection node is also associated with the aggregation layer device, wherein the context information includes at least an IP address previously assigned to the user device by the aggregation layer device; and forward traffic for the user device based on the IP address.

24. The non-transitory computer-readable medium of claim 23, wherein the instructions further cause the at least one processor to:

receive, during a transition period, traffic for the user device via a tunnel between the prior connection node and the connection node.

* * * * *